(12) United States Patent
Elkins, II

(10) Patent No.: US 11,536,921 B2
(45) Date of Patent: Dec. 27, 2022

(54) FIBER OPTIC TERMINALS HAVING ONE OR MORE LOOPBACK ASSEMBLIES

(71) Applicant: Corning Research & Development Corporation, Corning, NY (US)

(72) Inventor: Robert Bruce Elkins, II, Hickory, NC (US)

(73) Assignee: Corning Research & Development Corporation, Corning, NY (US)

( * ) Notice: Subject to any disclaimer, the term of this patent is extended or adjusted under 35 U.S.C. 154(b) by 0 days.

(21) Appl. No.: 17/171,275

(22) Filed: Feb. 9, 2021

(65) Prior Publication Data
US 2021/0247583 A1    Aug. 12, 2021

Related U.S. Application Data

(60) Provisional application No. 62/972,958, filed on Feb. 11, 2020.

(51) Int. Cl.
*G02B 6/44* (2006.01)

(52) U.S. Cl.
CPC ......... *G02B 6/4471* (2013.01); *G02B 6/4469* (2013.01)

(58) Field of Classification Search
CPC .................................................. G02B 6/4469
See application file for complete search history.

(56) References Cited

U.S. PATENT DOCUMENTS 3,074,107 A    1/1963 Kiyoshi et al.
3,532,783 A    10/1970 Pusey et al.
3,792,284 A    2/1974 Kaelin
4,003,297 A    1/1977 Mott
4,077,567 A    3/1978 Ginn et al.
4,148,557 A    4/1979 Garvey
4,188,088 A    2/1980 Andersen et al.
4,354,731 A    10/1982 Mouissie
(Continued)

FOREIGN PATENT DOCUMENTS

AU    2006232206 A1    10/2006
CA       2979491 A1     3/2018
(Continued)

OTHER PUBLICATIONS

Brown, "What is Transmission Welding?" Laser Plasti Welding website, 6 pgs, Retrieved on Dec. 17, 2018 from http://www.laserplasticwelding.com/what-is-transmission-welding.
(Continued)

*Primary Examiner* — Sung H Pak
(74) *Attorney, Agent, or Firm* — Michael E. Carroll, Jr.

(57) ABSTRACT

Fiber optic terminals having at least one loopback assembly comprising a loopback optical fiber providing optical communication between a first output connection port and a second output connection port of the terminal along with fiber optic networks using the terminals are disclosed. The loopback optical fiber is terminated with a first optical connector and a second optical connector. The first optical connector is attached to the first output connection port of the terminal and the second optical connector of the loopback assembly attached to the second output connection port of the terminal, thereby allowing the network operator to send a test signal to the terminal and receive a return signal when the terminal is installed in a fiber optic network.

42 Claims, 11 Drawing Sheets

(56) References Cited

U.S. PATENT DOCUMENTS

| | | | |
|---|---|---|---|
| 4,413,880 A | 11/1983 | Forrest et al. |
| 4,515,434 A | 5/1985 | Margolin et al. |
| 4,547,937 A | 10/1985 | Collins |
| 4,560,232 A | 12/1985 | O'Hara |
| 4,615,581 A | 10/1986 | Morimoto |
| 4,634,214 A | 1/1987 | Cannon et al. |
| 4,634,858 A | 1/1987 | Gerdt et al. |
| 4,684,205 A | 8/1987 | Margolin et al. |
| 4,688,200 A | 8/1987 | Poorman et al. |
| 4,699,458 A | 10/1987 | Ohtsuki et al. |
| 4,705,352 A | 11/1987 | Margolin et al. |
| 4,715,675 A | 12/1987 | Kevern et al. |
| 4,723,827 A | 2/1988 | Shaw et al. |
| 4,763,983 A | 8/1988 | Keith |
| 4,783,137 A | 11/1988 | Kosman et al. |
| 4,854,664 A | 8/1989 | McCartney |
| 4,856,867 A | 8/1989 | Gaylin |
| 4,902,238 A | 2/1990 | Iacobucci |
| 4,913,514 A | 4/1990 | Then |
| 4,921,413 A | 5/1990 | Blew |
| 4,960,318 A | 10/1990 | Nilsson et al. |
| 4,961,623 A | 10/1990 | Midkiff et al. |
| 4,964,688 A | 10/1990 | Caldwell et al. |
| 4,994,134 A | 2/1991 | Knecht et al. |
| 4,995,836 A | 2/1991 | Toramoto |
| 5,000,177 A | 3/1991 | Hoffmann et al. |
| 5,007,860 A | 4/1991 | Robinson et al. |
| 5,016,968 A | 5/1991 | Hammond et al. |
| 5,028,114 A | 7/1991 | Krausse et al. |
| 5,058,984 A | 10/1991 | Bulman et al. |
| 5,067,783 A | 11/1991 | Lampert |
| 5,073,042 A | 12/1991 | Mulholland et al. |
| 5,095,176 A | 3/1992 | Harbrecht et al. |
| 5,129,023 A | 7/1992 | Anderson et al. |
| 5,131,735 A | 7/1992 | Berkey et al. |
| 5,134,677 A | 7/1992 | Leung et al. |
| 5,136,683 A | 8/1992 | Aoki et al. |
| 5,146,519 A | 9/1992 | Miller et al. |
| 5,162,397 A | 11/1992 | Descamps et al. |
| 5,180,890 A | 1/1993 | Pendergrass et al. |
| 5,189,718 A | 2/1993 | Barrett et al. |
| 5,210,810 A | 5/1993 | Darden et al. |
| 5,212,752 A | 5/1993 | Stephenson et al. |
| 5,214,732 A | 5/1993 | Beard et al. |
| 5,263,105 A | 11/1993 | Johnson et al. |
| 5,263,239 A | 11/1993 | Ziemek |
| 5,313,540 A | 5/1994 | Ueda et al. |
| 5,367,594 A | 11/1994 | Essert et al. |
| 5,371,823 A | 12/1994 | Barrett et al. |
| 5,381,494 A | 1/1995 | O'Donnell et al. |
| 5,394,494 A | 2/1995 | Jennings et al. |
| 5,394,497 A | 2/1995 | Erdman et al. |
| 5,408,570 A | 4/1995 | Cook et al. |
| 5,416,874 A | 5/1995 | Giebel et al. |
| 5,519,799 A | 5/1996 | Murakami et al. |
| 5,553,186 A | 9/1996 | Allen |
| 5,569,050 A | 10/1996 | Lloyd |
| 5,600,747 A | 2/1997 | Yamakawa et al. |
| 5,631,993 A | 5/1997 | Cloud et al. |
| 5,647,045 A | 7/1997 | Robinson et al. |
| 5,673,346 A | 9/1997 | Iwano et al. |
| 5,682,451 A | 10/1997 | Lee et al. |
| 5,748,821 A | 5/1998 | Schempp et al. |
| 5,781,686 A | 7/1998 | Robinson et al. |
| 5,782,892 A | 7/1998 | Castle et al. |
| 5,789,701 A | 8/1998 | Wettengel et al. |
| 5,791,918 A | 8/1998 | Pierce |
| 5,796,895 A | 8/1998 | Jennings et al. |
| 5,862,290 A | 1/1999 | Burek et al. |
| 5,867,621 A | 2/1999 | Luther et al. |
| 5,913,001 A | 6/1999 | Nakajima et al. |
| 5,923,804 A | 7/1999 | Rosson |
| 5,960,141 A | 9/1999 | Sasaki et al. |
| 5,961,344 A | 10/1999 | Rosales et al. |
| 5,993,070 A | 11/1999 | Tamekuni et al. |
| 6,045,270 A | 4/2000 | Weiss et al. |
| 6,079,881 A | 6/2000 | Roth |
| 6,108,482 A | 8/2000 | Roth |
| 6,112,006 A | 8/2000 | Foss |
| 6,149,313 A | 11/2000 | Giebel et al. |
| 6,151,432 A | 11/2000 | Nakajima et al. |
| RE37,028 E | 1/2001 | Cooke et al. |
| 6,173,097 B1 | 1/2001 | Throckmorton et al. |
| 6,179,482 B1 | 1/2001 | Takizawa et al. |
| 6,188,822 B1 | 2/2001 | McAlpine et al. |
| 6,206,579 B1 | 3/2001 | Selfridge et al. |
| 6,206,581 B1 | 3/2001 | Driscoll et al. |
| 6,229,944 B1 | 5/2001 | Yokokawa et al. |
| 6,234,683 B1 | 5/2001 | Waldron et al. |
| 6,234,685 B1 | 5/2001 | Carlisle et al. |
| 6,249,628 B1 | 6/2001 | Rutterman et al. |
| 6,256,438 B1 | 7/2001 | Gimblet |
| 6,261,006 B1 | 7/2001 | Selfridge |
| 6,264,374 B1 | 7/2001 | Selfridge et al. |
| 6,287,016 B1 | 9/2001 | Weigel |
| 6,305,849 B1 | 10/2001 | Roehrs et al. |
| 6,321,013 B1 | 11/2001 | Hardwick et al. |
| 6,356,390 B1 | 3/2002 | Hall, Jr. |
| 6,356,690 B1 | 3/2002 | Mcalpine et al. |
| 6,357,929 B1 | 3/2002 | Roehrs et al. |
| 6,371,660 B1 | 4/2002 | Roehrs et al. |
| 6,375,363 B1 | 4/2002 | Harrison et al. |
| 6,379,054 B2 | 4/2002 | Throckmorton et al. |
| 6,386,891 B1 | 5/2002 | Howard et al. |
| 6,388,741 B1 * | 5/2002 | Beller ............ G01M 11/3127 356/73.1 |
| 6,404,962 B1 | 6/2002 | Hardwick et al. |
| 6,409,391 B1 | 6/2002 | Chang |
| 6,422,764 B1 | 7/2002 | Marrs et al. |
| 6,427,035 B1 | 7/2002 | Mahony |
| 6,439,780 B1 | 8/2002 | Mudd et al. |
| 6,466,725 B2 | 10/2002 | Battey et al. |
| 6,496,641 B1 | 12/2002 | Mahony |
| 6,501,888 B2 | 12/2002 | Gimblet et al. |
| 6,522,804 B1 | 2/2003 | Mahony |
| 6,529,663 B1 | 3/2003 | Parris et al. |
| 6,536,956 B2 | 3/2003 | Luther et al. |
| 6,539,147 B1 | 3/2003 | Mahony |
| 6,540,410 B2 | 4/2003 | Childers et al. |
| 6,542,674 B1 | 4/2003 | Gimblet |
| 6,546,175 B1 | 4/2003 | Wagman et al. |
| 6,554,489 B2 | 4/2003 | Kent et al. |
| 6,579,014 B2 | 6/2003 | Melton et al. |
| 6,599,026 B1 | 7/2003 | Bauer et al. |
| 6,599,027 B2 | 7/2003 | Miyake et al. |
| 6,614,980 B1 | 9/2003 | Mahony |
| 6,618,526 B2 | 9/2003 | Jackman et al. |
| 6,619,697 B2 | 9/2003 | Griffioen et al. |
| 6,621,964 B2 | 9/2003 | Quinn et al. |
| 6,625,375 B1 | 9/2003 | Mahony |
| 6,629,782 B2 | 10/2003 | McPhee et al. |
| 6,644,862 B1 | 11/2003 | Berto et al. |
| 6,648,520 B2 | 11/2003 | McDonald et al. |
| 6,668,127 B1 | 12/2003 | Mahony |
| 6,672,774 B2 | 1/2004 | Theuerkorn et al. |
| 6,678,442 B2 | 1/2004 | Gall et al. |
| 6,678,448 B2 | 1/2004 | Moisel et al. |
| 6,685,361 B1 | 2/2004 | Rubino et al. |
| 6,702,475 B1 | 3/2004 | Giobbio et al. |
| 6,714,708 B2 | 3/2004 | McAlpine et al. |
| 6,714,710 B2 | 3/2004 | Gimblet |
| 6,729,773 B2 | 5/2004 | Finona et al. |
| 6,738,555 B1 | 5/2004 | Cooke et al. |
| 6,748,146 B2 | 6/2004 | Parris |
| 6,748,147 B2 | 6/2004 | Quinn et al. |
| 6,771,861 B2 | 8/2004 | Wagner et al. |
| 6,785,450 B2 | 8/2004 | Wagman et al. |
| 6,789,950 B1 | 9/2004 | Loder et al. |
| 6,809,265 B1 | 10/2004 | Gladd et al. |
| 6,848,838 B2 | 2/2005 | Doss et al. |
| 6,856,748 B1 | 2/2005 | Elkins et al. |
| 6,899,467 B2 | 5/2005 | McDonald et al. |
| 6,909,821 B2 | 6/2005 | Ravasio et al. |
| 6,916,120 B2 | 7/2005 | Zimmel et al. |

(56) References Cited

U.S. PATENT DOCUMENTS

| | | |
|---|---|---|
| 6,962,445 B2 | 11/2005 | Zimmel et al. |
| 7,011,454 B2 | 3/2006 | Caveney et al. |
| 7,025,507 B2 | 4/2006 | de Marchi |
| 7,033,191 B1 | 4/2006 | Cao |
| 7,079,734 B2 | 7/2006 | Seddon et al. |
| 7,090,406 B2 | 8/2006 | Melton et al. |
| 7,090,407 B2 | 8/2006 | Melton et al. |
| 7,090,409 B2 | 8/2006 | Nakajima et al. |
| 7,104,702 B2 | 9/2006 | Barnes et al. |
| 7,111,990 B2 | 9/2006 | Melton et al. |
| 7,113,679 B2 | 9/2006 | Melton et al. |
| 7,120,347 B2 | 10/2006 | Blackwell et al. |
| 7,137,742 B2 | 11/2006 | Theuerkorn et al. |
| 7,146,090 B2 | 12/2006 | Vo et al. |
| 7,150,567 B1 | 12/2006 | Luther et al. |
| 7,165,893 B2 | 1/2007 | Schmitz |
| 7,178,990 B2 | 2/2007 | Caveney et al. |
| 7,184,634 B2 | 2/2007 | Hurley et al. |
| 7,204,644 B2 | 4/2007 | Barnes et al. |
| 7,213,975 B2 | 5/2007 | Khemakhem et al. |
| 7,228,047 B1 | 6/2007 | Szilagyi et al. |
| 7,241,056 B1 | 7/2007 | Kuffel et al. |
| 7,266,265 B2 | 9/2007 | Gall et al. |
| 7,270,487 B2 | 9/2007 | Billman et al. |
| 7,277,614 B2 | 10/2007 | Cody et al. |
| 7,302,152 B2 | 11/2007 | Luther et al. |
| 7,330,629 B2 | 2/2008 | Cooke et al. |
| 7,333,708 B2 | 2/2008 | Blackwell et al. |
| 7,346,256 B2 | 3/2008 | Marrs et al. |
| 7,366,416 B2 | 4/2008 | Ramachandran et al. |
| 7,444,056 B2 | 10/2008 | Allen et al. |
| 7,463,803 B2 | 12/2008 | Cody et al. |
| 7,467,896 B2 | 12/2008 | Melton et al. |
| 7,489,849 B2 | 2/2009 | Reagan et al. |
| 7,497,896 B2 | 3/2009 | Bromet et al. |
| 7,512,304 B2 | 3/2009 | Gronvall et al. |
| 7,542,645 B1 | 6/2009 | Hua et al. |
| 7,565,055 B2 * | 7/2009 | Lu .................. G02B 6/3887 430/311 |
| 7,596,293 B2 | 9/2009 | Isenhour et al. |
| 7,614,797 B2 | 11/2009 | Lu et al. |
| 7,621,675 B1 | 11/2009 | Bradley |
| 7,627,222 B2 | 12/2009 | Reagan et al. |
| 7,628,545 B2 | 12/2009 | Cody et al. |
| 7,628,548 B2 | 12/2009 | Benjamin et al. |
| 7,653,282 B2 | 1/2010 | Blackwell et al. |
| 7,654,747 B2 | 2/2010 | Theuerkorn et al. |
| 7,680,388 B2 | 3/2010 | Reagan et al. |
| 7,708,476 B2 | 5/2010 | Liu |
| 7,709,733 B1 | 5/2010 | Plankell |
| 7,713,679 B2 | 5/2010 | Ishiduka et al. |
| 7,740,409 B2 | 6/2010 | Bolton et al. |
| 7,742,117 B2 | 6/2010 | Lee et al. |
| 7,742,670 B2 | 6/2010 | Benjamin et al. |
| 7,753,596 B2 | 7/2010 | Cox |
| 7,785,015 B2 | 8/2010 | Melton et al. |
| 7,802,926 B2 | 9/2010 | Leeman et al. |
| 7,806,599 B2 | 10/2010 | Margolin et al. |
| 7,844,148 B2 | 11/2010 | Jenkins et al. |
| 7,844,160 B2 | 11/2010 | Reagan et al. |
| RE42,094 E | 2/2011 | Barnes et al. |
| 7,903,923 B2 | 3/2011 | Gronvall et al. |
| 7,903,925 B2 | 3/2011 | Cooke et al. |
| 7,918,609 B2 | 4/2011 | Melton et al. |
| 7,933,517 B2 | 4/2011 | Ye et al. |
| 7,942,590 B2 | 5/2011 | Lu et al. |
| 8,025,445 B2 | 9/2011 | Rambow et al. |
| 8,036,504 B2 | 10/2011 | Lu |
| 8,213,761 B2 | 7/2012 | Gronvall et al. |
| 8,218,935 B2 | 7/2012 | Reagan et al. |
| 8,229,263 B2 | 7/2012 | Parris et al. |
| 8,238,706 B2 | 8/2012 | Kachmar |
| 8,267,596 B2 | 9/2012 | Theuerkorn |
| 8,272,792 B2 | 9/2012 | Coleman et al. |
| RE43,762 E | 10/2012 | Smith et al. |
| 8,301,003 B2 | 10/2012 | De et al. |
| 8,301,004 B2 | 10/2012 | Cooke et al. |
| 8,376,629 B2 | 2/2013 | Cline et al. |
| 8,408,811 B2 | 4/2013 | De et al. |
| 8,439,577 B2 | 5/2013 | Jenkins |
| 8,465,235 B2 | 6/2013 | Jenkins et al. |
| 8,466,262 B2 | 6/2013 | Siadak et al. |
| 8,472,773 B2 | 6/2013 | De Jong |
| 8,480,312 B2 | 7/2013 | Smith et al. |
| 8,520,996 B2 | 8/2013 | Cowen et al. |
| 8,534,928 B2 | 9/2013 | Cooke et al. |
| 8,556,522 B2 | 10/2013 | Cunningham |
| 8,622,634 B2 | 1/2014 | Arnold et al. |
| 8,662,760 B2 | 3/2014 | Cline et al. |
| 8,678,668 B2 | 3/2014 | Cooke et al. |
| 8,687,930 B2 | 4/2014 | Mcdowell et al. |
| 8,727,638 B2 | 5/2014 | Lee et al. |
| 8,737,837 B2 | 5/2014 | Conner et al. |
| 8,750,702 B1 | 6/2014 | Figueira et al. |
| 8,755,654 B1 | 6/2014 | Danley et al. |
| 8,755,663 B2 | 6/2014 | Makrides-Saravanos et al. |
| 8,758,046 B2 | 6/2014 | Pezzetti et al. |
| 8,764,316 B1 | 7/2014 | Barnette et al. |
| 8,770,861 B2 | 7/2014 | Smith et al. |
| 8,798,456 B2 | 8/2014 | Skirmont et al. |
| 8,821,036 B2 | 9/2014 | Shigehara |
| 8,870,469 B2 | 10/2014 | Kachmar |
| 8,882,364 B2 | 11/2014 | Busse et al. |
| 8,917,966 B2 | 12/2014 | Thompson et al. |
| 8,992,097 B2 | 3/2015 | Koreeda et al. |
| 8,998,502 B2 | 4/2015 | Benjamin et al. |
| 9,158,074 B2 | 10/2015 | Anderson et al. |
| 9,158,075 B2 | 10/2015 | Benjamin et al. |
| 9,207,410 B2 | 12/2015 | Lee et al. |
| 9,297,974 B2 | 3/2016 | Valderrabano et al. |
| 9,310,570 B2 | 4/2016 | Busse et al. |
| 9,322,998 B2 | 4/2016 | Miller |
| 9,383,539 B2 | 7/2016 | Hill et al. |
| 9,405,068 B2 | 8/2016 | Graham et al. |
| 9,435,969 B2 | 9/2016 | Lambourn et al. |
| 9,442,257 B2 | 9/2016 | Lu |
| 9,450,393 B2 | 9/2016 | Thompson et al. |
| 9,482,819 B2 | 11/2016 | Li et al. |
| 9,513,444 B2 | 12/2016 | Barnette et al. |
| 9,535,229 B2 | 1/2017 | Ott et al. |
| 9,541,711 B2 | 1/2017 | Raven et al. |
| 9,551,842 B2 | 1/2017 | Theuerkorn |
| 9,618,704 B2 | 4/2017 | Dean et al. |
| 9,645,331 B1 | 5/2017 | Kim |
| 9,651,741 B2 | 5/2017 | Isenhour et al. |
| 9,684,136 B2 | 6/2017 | Cline et al. |
| 9,684,138 B2 | 6/2017 | Lu |
| 9,696,500 B2 | 7/2017 | Barnette et al. |
| 9,739,951 B2 | 8/2017 | Busse et al. |
| 9,762,322 B1 | 9/2017 | Amundson |
| 9,766,416 B1 | 9/2017 | Kim |
| 9,772,457 B2 | 9/2017 | Hill et al. |
| 9,810,855 B2 | 11/2017 | Cox et al. |
| 9,810,856 B2 | 11/2017 | Graham et al. |
| 9,829,668 B2 | 11/2017 | Coenegracht et al. |
| 9,857,540 B2 | 1/2018 | Ahmed et al. |
| 9,864,151 B2 | 1/2018 | Lu |
| D810,029 S | 2/2018 | Robert et al. |
| 9,891,391 B2 | 2/2018 | Watanabe |
| 9,910,236 B2 | 3/2018 | Cooke et al. |
| 9,964,715 B2 | 5/2018 | Lu |
| 9,977,193 B2 * | 5/2018 | Abe .................. G02B 6/3823 |
| 9,983,374 B2 | 5/2018 | Li et al. |
| 10,031,302 B2 | 7/2018 | Ji et al. |
| 10,038,946 B2 | 7/2018 | Smolorz |
| 10,061,090 B2 | 8/2018 | Coenegracht |
| 10,073,224 B2 | 9/2018 | Tong et al. |
| 10,114,176 B2 | 10/2018 | Gimblet et al. |
| 10,209,454 B2 | 2/2019 | Isenhour et al. |
| 10,235,184 B2 | 3/2019 | Walker |
| 10,261,268 B2 | 4/2019 | Theuerkorn |
| 10,268,011 B2 | 4/2019 | Courchaine et al. |
| 10,288,820 B2 | 5/2019 | Coenegracht |
| 10,353,154 B2 | 7/2019 | Ott et al. |

(56) References Cited

U.S. PATENT DOCUMENTS

| | | |
|---|---|---|
| 10,353,156 B2 | 7/2019 | Hill et al. |
| 10,359,577 B2 | 7/2019 | Dannoux et al. |
| 10,379,298 B2* | 8/2019 | Dannoux ............ G02B 6/3851 |
| 10,401,575 B2 | 9/2019 | Daily et al. |
| 10,401,578 B2 | 9/2019 | Coenegracht |
| 10,409,007 B2 | 9/2019 | Kadar-Kallen et al. |
| 10,422,962 B2 | 9/2019 | Coenegracht |
| 10,451,817 B2 | 10/2019 | Lu |
| 10,451,830 B2 | 10/2019 | Szumacher et al. |
| 10,488,597 B2 | 11/2019 | Parikh et al. |
| 10,495,822 B2 | 12/2019 | Nhep |
| 10,520,683 B2 | 12/2019 | Nhep |
| 10,578,821 B2 | 3/2020 | Ott et al. |
| 10,606,006 B2 | 3/2020 | Hill et al. |
| 10,613,278 B2 | 4/2020 | Kempeneers et al. |
| 10,656,347 B2 | 5/2020 | Kato |
| 10,712,516 B2 | 7/2020 | Courchaine et al. |
| 10,739,534 B2 | 8/2020 | Murray et al. |
| 10,782,487 B2 | 9/2020 | Lu |
| 10,802,236 B2 | 10/2020 | Kowalczyk et al. |
| 10,830,967 B2 | 11/2020 | Pimentel et al. |
| 10,830,975 B2 | 11/2020 | Vaughn et al. |
| 10,852,498 B2 | 12/2020 | Hill et al. |
| 10,852,499 B2 | 12/2020 | Cooke et al. |
| 10,859,771 B2 | 12/2020 | Nhep |
| 10,859,781 B2 | 12/2020 | Hill et al. |
| 10,962,731 B2 | 3/2021 | Coenegracht |
| 10,976,500 B2 | 4/2021 | Ott et al. |
| 11,061,191 B2 | 7/2021 | Van Baelen et al. |
| 11,290,188 B2 | 3/2022 | Tuccio et al. |
| 2001/0019654 A1 | 9/2001 | Waldron et al. |
| 2001/0036342 A1 | 11/2001 | Knecht et al. |
| 2001/0036345 A1 | 11/2001 | Gimblet et al. |
| 2002/0012502 A1 | 1/2002 | Farrar et al. |
| 2002/0062978 A1 | 5/2002 | Sakabe et al. |
| 2002/0064364 A1 | 5/2002 | Battey et al. |
| 2002/0081077 A1 | 6/2002 | Nault |
| 2002/0122653 A1 | 9/2002 | Donaldson et al. |
| 2002/0131721 A1 | 9/2002 | Gaio et al. |
| 2003/0063866 A1 | 4/2003 | Melton et al. |
| 2003/0063867 A1 | 4/2003 | McDonald et al. |
| 2003/0063868 A1 | 4/2003 | Fentress |
| 2003/0063897 A1 | 4/2003 | Heo |
| 2003/0094298 A1 | 5/2003 | Morrow et al. |
| 2003/0099448 A1 | 5/2003 | Gimblet |
| 2003/0103733 A1 | 6/2003 | Fleenor et al. |
| 2004/0047566 A1 | 3/2004 | McDonald et al. |
| 2004/0072454 A1 | 4/2004 | Nakajima et al. |
| 2004/0076377 A1 | 4/2004 | Mizukami et al. |
| 2004/0076386 A1 | 4/2004 | Nechitailo |
| 2004/0096162 A1 | 5/2004 | Kocher et al. |
| 2004/0120662 A1 | 6/2004 | Lail et al. |
| 2004/0120663 A1 | 6/2004 | Lail et al. |
| 2004/0157449 A1 | 8/2004 | Hidaka et al. |
| 2004/0157499 A1 | 8/2004 | Nania et al. |
| 2004/0223699 A1 | 11/2004 | Melton et al. |
| 2004/0223720 A1 | 11/2004 | Melton et al. |
| 2004/0228589 A1 | 11/2004 | Melton et al. |
| 2004/0240808 A1 | 12/2004 | Rhoney et al. |
| 2004/0252954 A1 | 12/2004 | Ginocchio et al. |
| 2005/0019031 A1 | 1/2005 | Ye et al. |
| 2005/0036786 A1 | 2/2005 | Ramachandran et al. |
| 2005/0054237 A1 | 3/2005 | Gladd et al. |
| 2005/0129379 A1 | 6/2005 | Reagan et al. |
| 2005/0175307 A1 | 8/2005 | Battey et al. |
| 2005/0213902 A1 | 9/2005 | Parsons |
| 2005/0232552 A1 | 10/2005 | Takahashi et al. |
| 2005/0271344 A1 | 12/2005 | Grubish et al. |
| 2005/0281510 A1 | 12/2005 | Vo et al. |
| 2005/0281514 A1 | 12/2005 | Oki et al. |
| 2006/0045430 A1 | 3/2006 | Theuerkorn et al. |
| 2006/0088247 A1 | 4/2006 | Tran et al. |
| 2006/0093278 A1 | 5/2006 | Elkins et al. |
| 2006/0093303 A1 | 5/2006 | Reagan et al. |
| 2006/0120672 A1 | 6/2006 | Cody et al. |
| 2006/0127016 A1 | 6/2006 | Baird et al. |
| 2006/0133758 A1 | 6/2006 | Mullaney et al. |
| 2006/0133759 A1 | 6/2006 | Mullaney et al. |
| 2006/0147172 A1 | 7/2006 | Luther et al. |
| 2006/0153503 A1 | 7/2006 | Suzuki et al. |
| 2006/0153517 A1 | 7/2006 | Reagan et al. |
| 2006/0171638 A1 | 8/2006 | Dye |
| 2006/0269204 A1 | 11/2006 | Barth et al. |
| 2006/0269208 A1 | 11/2006 | Allen et al. |
| 2006/0280420 A1 | 12/2006 | Blackwell et al. |
| 2006/0283619 A1 | 12/2006 | Kowalczyk et al. |
| 2006/0291787 A1 | 12/2006 | Seddon |
| 2007/0031100 A1 | 2/2007 | Garcia et al. |
| 2007/0031103 A1 | 2/2007 | Tinucci et al. |
| 2007/0036483 A1 | 2/2007 | Shin et al. |
| 2007/0077010 A1 | 4/2007 | Melton et al. |
| 2007/0098343 A1 | 5/2007 | Miller et al. |
| 2007/0189695 A1 | 8/2007 | Bludau et al. |
| 2008/0020532 A1 | 1/2008 | Monfray et al. |
| 2008/0080817 A1 | 4/2008 | Melton et al. |
| 2008/0138016 A1 | 6/2008 | Katagiyama et al. |
| 2008/0175542 A1 | 7/2008 | Lu et al. |
| 2008/0175544 A1 | 7/2008 | Fujiwara et al. |
| 2008/0175548 A1 | 7/2008 | Knecht et al. |
| 2008/0232743 A1 | 9/2008 | Gronvall et al. |
| 2008/0240658 A1 | 10/2008 | Leeman et al. |
| 2008/0264664 A1 | 10/2008 | Dinh et al. |
| 2008/0273837 A1 | 11/2008 | Margolin et al. |
| 2009/0041412 A1 | 2/2009 | Danley et al. |
| 2009/0060421 A1 | 3/2009 | Parikh et al. |
| 2009/0148101 A1 | 6/2009 | Lu et al. |
| 2009/0148104 A1 | 6/2009 | Lu et al. |
| 2009/0156041 A1 | 6/2009 | Radle |
| 2009/0185835 A1 | 7/2009 | Park et al. |
| 2009/0245743 A1 | 10/2009 | Cote et al. |
| 2009/0263097 A1 | 10/2009 | Solheid et al. |
| 2009/0317039 A1 | 12/2009 | Blazer et al. |
| 2010/0008909 A1 | 1/2010 | Siadak et al. |
| 2010/0014813 A1 | 1/2010 | Ito et al. |
| 2010/0014867 A1 | 1/2010 | Ramanitra et al. |
| 2010/0015834 A1 | 1/2010 | Siebens |
| 2010/0040338 A1 | 2/2010 | Sek |
| 2010/0054680 A1 | 3/2010 | Lochkovic et al. |
| 2010/0074578 A1 | 3/2010 | Imaizumi et al. |
| 2010/0092136 A1 | 4/2010 | Nhep |
| 2010/0172616 A1 | 7/2010 | Lu et al. |
| 2010/0197222 A1 | 8/2010 | Scheucher |
| 2010/0232753 A1 | 9/2010 | Parris et al. |
| 2010/0247053 A1 | 9/2010 | Cowen et al. |
| 2010/0266245 A1 | 10/2010 | Sabo |
| 2010/0272399 A1 | 10/2010 | Griffiths et al. |
| 2010/0303426 A1 | 12/2010 | Davis |
| 2010/0310213 A1 | 12/2010 | Lewallen et al. |
| 2011/0019964 A1 | 1/2011 | Nhep et al. |
| 2011/0047731 A1 | 3/2011 | Sugita et al. |
| 2011/0069932 A1 | 3/2011 | Overton et al. |
| 2011/0108719 A1 | 5/2011 | Ford et al. |
| 2011/0129186 A1 | 6/2011 | Lewallen et al. |
| 2011/0164854 A1 | 7/2011 | Desard et al. |
| 2011/0222826 A1 | 9/2011 | Blackburn et al. |
| 2011/0262099 A1 | 10/2011 | Castonguay et al. |
| 2011/0299814 A1 | 12/2011 | Nakagawa |
| 2012/0002925 A1 | 1/2012 | Nakagawa |
| 2012/0008909 A1 | 1/2012 | Mertesdorf et al. |
| 2012/0106912 A1 | 5/2012 | Mcgranahan et al. |
| 2012/0183268 A1 | 7/2012 | De et al. |
| 2012/0251060 A1 | 10/2012 | Hurley |
| 2012/0251063 A1 | 10/2012 | Reagan et al. |
| 2012/0252244 A1 | 10/2012 | Elkins et al. |
| 2013/0004122 A1 | 1/2013 | Kingsbury |
| 2013/0034333 A1 | 2/2013 | Holmberg et al. |
| 2013/0064506 A1 | 3/2013 | Eberle et al. |
| 2013/0094821 A1 | 4/2013 | Logan |
| 2013/0109213 A1 | 5/2013 | Chang |
| 2013/0170834 A1 | 7/2013 | Cho et al. |
| 2013/0236139 A1 | 9/2013 | Chen et al. |
| 2014/0016902 A1 | 1/2014 | Pepe |
| 2014/0050446 A1 | 2/2014 | Chang |
| 2014/0072297 A1 | 3/2014 | Thompson |

(56) References Cited

U.S. PATENT DOCUMENTS

| | | |
|---|---|---|
| 2014/0079356 A1 | 3/2014 | Pepin et al. |
| 2014/0133806 A1 | 5/2014 | Hill et al. |
| 2014/0133807 A1 | 5/2014 | Katoh |
| 2014/0153876 A1 | 6/2014 | Dendas et al. |
| 2014/0161397 A1 | 6/2014 | Gallegos et al. |
| 2014/0205257 A1 | 7/2014 | Durrant et al. |
| 2014/0219622 A1 | 8/2014 | Coan et al. |
| 2014/0233896 A1 | 8/2014 | Ishigami et al. |
| 2014/0241671 A1 | 8/2014 | Koreeda et al. |
| 2014/0241689 A1 | 8/2014 | Bradley et al. |
| 2014/0294395 A1 | 10/2014 | Waldron et al. |
| 2014/0328559 A1 | 11/2014 | Kobayashi et al. |
| 2014/0348467 A1 | 11/2014 | Cote et al. |
| 2014/0355936 A1 | 12/2014 | Bund et al. |
| 2015/0003788 A1 | 1/2015 | Chen et al. |
| 2015/0036982 A1 | 2/2015 | Nhep et al. |
| 2015/0110451 A1 | 4/2015 | Blazer et al. |
| 2015/0144883 A1 | 5/2015 | Sendelweck |
| 2015/0185423 A1 | 7/2015 | Matsui et al. |
| 2015/0253528 A1 | 9/2015 | Corbille et al. |
| 2015/0268434 A1 | 9/2015 | Barnette et al. |
| 2015/0309274 A1 | 10/2015 | Hurley et al. |
| 2015/0316727 A1 | 11/2015 | Kondo et al. |
| 2015/0346435 A1 | 12/2015 | Kato |
| 2015/0346436 A1 | 12/2015 | Pepe et al. |
| 2016/0015885 A1 | 1/2016 | Pananen et al. |
| 2016/0126667 A1 | 5/2016 | Droesbeke et al. |
| 2016/0131851 A1 | 5/2016 | Theuerkorn |
| 2016/0131857 A1 | 5/2016 | Pimentel et al. |
| 2016/0139346 A1 | 5/2016 | Bund et al. |
| 2016/0154186 A1 | 6/2016 | Gimblet et al. |
| 2016/0161688 A1 | 6/2016 | Nishimura |
| 2016/0161689 A1 | 6/2016 | Nishimura |
| 2016/0209599 A1 | 7/2016 | Van et al. |
| 2016/0216468 A1 | 7/2016 | Gimblet et al. |
| 2016/0238810 A1 | 8/2016 | Hubbard et al. |
| 2016/0246019 A1 | 8/2016 | Ishii et al. |
| 2016/0249019 A1 | 8/2016 | Westwick et al. |
| 2016/0259133 A1 | 9/2016 | Kobayashi et al. |
| 2016/0306122 A1 | 10/2016 | Tong et al. |
| 2017/0038538 A1 | 2/2017 | Isenhour et al. |
| 2017/0040788 A1 | 2/2017 | Paolozzi et al. |
| 2017/0131509 A1 | 5/2017 | Xiao et al. |
| 2017/0139158 A1 | 5/2017 | Coenegracht |
| 2017/0160492 A1 | 6/2017 | Lin et al. |
| 2017/0168248 A1 | 6/2017 | Hayauchi et al. |
| 2017/0170596 A1 | 6/2017 | Goossens et al. |
| 2017/0176252 A1 | 6/2017 | Marple et al. |
| 2017/0176690 A1 | 6/2017 | Bretz et al. |
| 2017/0219782 A1 | 8/2017 | Nishimura |
| 2017/0238822 A1 | 8/2017 | Young et al. |
| 2017/0254961 A1 | 9/2017 | Kamada et al. |
| 2017/0254962 A1 | 9/2017 | Mueller-Schlomka et al. |
| 2017/0261699 A1 | 9/2017 | Compton et al. |
| 2017/0285279 A1 | 10/2017 | Daems et al. |
| 2017/0351037 A1 | 12/2017 | Watanabe et al. |
| 2018/0081127 A1 | 3/2018 | Coenegracht |
| 2018/0180831 A1 | 6/2018 | Blazer et al. |
| 2018/0267265 A1 | 9/2018 | Zhang et al. |
| 2019/0004252 A1 | 1/2019 | Rosson |
| 2019/0147202 A1 | 5/2019 | Harney |
| 2019/0162910 A1 | 5/2019 | Gurreri |
| 2019/0187396 A1 | 6/2019 | Finnegan et al. |
| 2019/0277725 A1* | 9/2019 | Adams ................ G02B 6/3897 |
| 2020/0049922 A1 | 2/2020 | Rosson |
| 2020/0057205 A1 | 2/2020 | Dannoux et al. |
| 2020/0057222 A1 | 2/2020 | Dannoux et al. |
| 2020/0057224 A1 | 2/2020 | Dannoux et al. |
| 2020/0057723 A1 | 2/2020 | Chirca et al. |
| 2020/0103608 A1 | 4/2020 | Johnson et al. |
| 2020/0110229 A1 | 4/2020 | Dannoux et al. |
| 2020/0116958 A1 | 4/2020 | Dannoux et al. |
| 2020/0124812 A1 | 4/2020 | Dannoux et al. |
| 2020/0348476 A1 | 11/2020 | Hill et al. |
| 2020/0371306 A1 | 11/2020 | Mosier et al. |
| 2020/0393629 A1 | 12/2020 | Hill et al. |
| 2021/0041634 A1 | 2/2021 | Jensen et al. |

FOREIGN PATENT DOCUMENTS

| | | |
|---|---|---|
| CN | 1060911 A | 5/1992 |
| CN | 1071012 A | 4/1993 |
| CN | 1213783 A | 4/1999 |
| CN | 1231430 A | 10/1999 |
| CN | 1114839 C | 7/2003 |
| CN | 1646962 A | 7/2005 |
| CN | 1833188 A | 9/2006 |
| CN | 1922523 A | 2/2007 |
| CN | 1985205 A | 6/2007 |
| CN | 101084461 A | 12/2007 |
| CN | 101111790 A | 1/2008 |
| CN | 101195453 A | 6/2008 |
| CN | 101846773 A | 9/2010 |
| CN | 101939680 A | 1/2011 |
| CN | 201704194 U | 1/2011 |
| CN | 101379735 B | 11/2011 |
| CN | 102346281 A | 2/2012 |
| CN | 202282523 U | 6/2012 |
| CN | 203224645 U | 10/2013 |
| CN | 203396982 U | 1/2014 |
| CN | 103713362 A | 4/2014 |
| CN | 104064903 A | 9/2014 |
| CN | 104280830 A | 1/2015 |
| CN | 104603656 A | 5/2015 |
| CN | 105467529 A | 4/2016 |
| CN | 105492946 A | 4/2016 |
| CN | 106716205 A | 5/2017 |
| CN | 106873086 A | 6/2017 |
| DE | 3537684 A1 | 4/1987 |
| DE | 3737842 C1 | 9/1988 |
| DE | 19805554 A1 | 8/1998 |
| EP | 0012566 A1 | 6/1980 |
| EP | 0122566 A2 | 10/1984 |
| EP | 0130513 A2 | 1/1985 |
| EP | 0244791 A2 | 11/1987 |
| EP | 0462362 A2 | 12/1991 |
| EP | 0468671 A1 | 1/1992 |
| EP | 0469671 A1 | 2/1992 |
| EP | 0547778 A1 | 6/1993 |
| EP | 0762171 A1 | 3/1997 |
| EP | 0782025 A1 | 7/1997 |
| EP | 0855610 A2 | 7/1998 |
| EP | 0856761 A1 | 8/1998 |
| EP | 0940700 A2 | 9/1999 |
| EP | 0949522 A2 | 10/1999 |
| EP | 0957381 A1 | 11/1999 |
| EP | 0997757 A2 | 5/2000 |
| EP | 1065542 A1 | 1/2001 |
| EP | 1122566 A2 | 8/2001 |
| EP | 1243957 A2 | 9/2002 |
| EP | 1258758 A2 | 11/2002 |
| EP | 1391762 A1 | 2/2004 |
| EP | 1431786 A2 | 6/2004 |
| EP | 1438622 A2 | 7/2004 |
| EP | 1678537 A1 | 7/2006 |
| EP | 1759231 A1 | 3/2007 |
| EP | 1810062 A1 | 7/2007 |
| EP | 2069845 A2 | 6/2009 |
| EP | 2149063 A1 | 2/2010 |
| EP | 2150847 A1 | 2/2010 |
| EP | 2193395 A1 | 6/2010 |
| EP | 2255233 A1 | 12/2010 |
| EP | 2333597 A2 | 6/2011 |
| EP | 2362253 A1 | 8/2011 |
| EP | 2401641 A1 | 1/2012 |
| EP | 2609458 A1 | 7/2013 |
| EP | 2622395 A1 | 8/2013 |
| EP | 2734879 A1 | 5/2014 |
| EP | 2815259 A1 | 12/2014 |
| EP | 2817667 A1 | 12/2014 |
| EP | 2893383 A1 | 7/2015 |
| EP | 2992372 A1 | 3/2016 |
| EP | 3022596 A1 | 5/2016 |

(56) References Cited

FOREIGN PATENT DOCUMENTS

| | | |
|---|---|---|
| EP | 3064973 A2 | 9/2016 |
| EP | 3101740 A1 | 12/2016 |
| EP | 3207223 A1 | 8/2017 |
| EP | 3245545 A1 | 11/2017 |
| EP | 3265859 A1 | 1/2018 |
| EP | 3336992 A1 | 6/2018 |
| EP | 3362830 A1 | 8/2018 |
| EP | 3427096 A1 | 1/2019 |
| EP | 3443395 A1 | 2/2019 |
| EP | 3535614 A1 | 9/2019 |
| EP | 3537197 A1 | 9/2019 |
| EP | 3646074 A1 | 5/2020 |
| EP | 3646079 A1 | 5/2020 |
| ES | 1184287 U | 5/2017 |
| FR | 2485754 A1 | 12/1981 |
| GB | 2022284 A | 12/1979 |
| GB | 2154333 A | 9/1985 |
| GB | 2169094 A | 7/1986 |
| JP | 52-030447 A | 3/1977 |
| JP | 58-142308 A | 8/1983 |
| JP | 61-145509 A | 7/1986 |
| JP | 62-054204 A | 3/1987 |
| JP | 63-020111 A | 1/1988 |
| JP | 63-078908 A | 4/1988 |
| JP | 63-089421 A | 4/1988 |
| JP | 03-063615 A | 3/1991 |
| JP | 03-207223 A | 9/1991 |
| JP | 05-106765 A | 4/1993 |
| JP | 05-142439 A | 6/1993 |
| JP | 05-297246 A | 11/1993 |
| JP | 07-318758 A | 12/1995 |
| JP | 08-050211 A | 2/1996 |
| JP | 08-054522 A | 2/1996 |
| JP | 08-062432 A | 3/1996 |
| JP | 08-292331 A | 11/1996 |
| JP | 09-049942 A | 2/1997 |
| JP | 09-135526 A | 5/1997 |
| JP | 09-159867 A | 6/1997 |
| JP | 09-203831 A | 8/1997 |
| JP | 09-325223 A | 12/1997 |
| JP | 09-325249 A | 12/1997 |
| JP | 10-170781 A | 6/1998 |
| JP | 10-332953 A | 12/1998 |
| JP | 10-339826 A | 12/1998 |
| JP | 11-064682 A | 3/1999 |
| JP | 11-119064 A | 4/1999 |
| JP | 11-248979 A | 9/1999 |
| JP | 11-271582 A | 10/1999 |
| JP | 11-281861 A | 10/1999 |
| JP | 11-326693 A | 11/1999 |
| JP | 11-337768 A | 12/1999 |
| JP | 11-352368 A | 12/1999 |
| JP | 2000-002828 A | 1/2000 |
| JP | 2001-116968 A | 4/2001 |
| JP | 2001-290051 A | 10/2001 |
| JP | 2002-520987 A | 7/2002 |
| JP | 2002-250987 A | 9/2002 |
| JP | 2003-009331 A | 1/2003 |
| JP | 2003-070143 A | 3/2003 |
| JP | 2003-121699 A | 4/2003 |
| JP | 2003-177279 A | 6/2003 |
| JP | 2003-302561 A | 10/2003 |
| JP | 2004-361521 A | 12/2004 |
| JP | 2005-024789 A | 1/2005 |
| JP | 2005-031544 A | 2/2005 |
| JP | 2005-077591 A | 3/2005 |
| JP | 2005-114860 A | 4/2005 |
| JP | 2006-023502 A | 1/2006 |
| JP | 2006-146084 A | 6/2006 |
| JP | 2006-259631 A | 9/2006 |
| JP | 2006-337637 A | 12/2006 |
| JP | 2007-078740 A | 3/2007 |
| JP | 2007-121859 A | 5/2007 |
| JP | 2008-191422 A | 8/2008 |
| JP | 2008-250360 A | 10/2008 |
| JP | 2009-265208 A | 11/2009 |
| JP | 2010-152084 A | 7/2010 |
| JP | 2010-191420 A | 9/2010 |
| JP | 2011-033698 A | 2/2011 |
| JP | 2013-041089 A | 2/2013 |
| JP | 2013-156580 A | 8/2013 |
| JP | 2014-085474 A | 5/2014 |
| JP | 2014-095834 A | 5/2014 |
| JP | 2014-134746 A | 7/2014 |
| JP | 5537852 B2 | 7/2014 |
| JP | 5538328 B2 | 7/2014 |
| JP | 2014-157214 A | 8/2014 |
| JP | 2014-219441 A | 11/2014 |
| JP | 2015-125217 A | 7/2015 |
| JP | 2016-109816 A | 6/2016 |
| JP | 2016-109817 A | 6/2016 |
| JP | 2016-109819 A | 6/2016 |
| JP | 2016-156916 A | 9/2016 |
| JP | 3207223 U | 11/2016 |
| JP | 3207233 U | 11/2016 |
| KR | 10-2013-0081087 A | 7/2013 |
| TW | 222688 B | 4/1994 |
| WO | 94/25885 A1 | 11/1994 |
| WO | 98/36304 A1 | 8/1998 |
| WO | 01/27660 A2 | 4/2001 |
| WO | 01/92937 A1 | 12/2001 |
| WO | 02/25340 A1 | 3/2002 |
| WO | 03/36358 A2 | 5/2003 |
| WO | 2004/061509 A1 | 7/2004 |
| WO | 2005/045494 A1 | 5/2005 |
| WO | 2006/009597 A1 | 1/2006 |
| WO | 2006/052420 A1 | 5/2006 |
| WO | 2006/113726 A1 | 10/2006 |
| WO | 2006/123777 A1 | 11/2006 |
| WO | 2008/027201 A2 | 3/2008 |
| WO | 2008/150408 A1 | 12/2008 |
| WO | 2008/150423 A1 | 12/2008 |
| WO | 2009/042066 A1 | 4/2009 |
| WO | 2009/113819 A1 | 9/2009 |
| WO | 2009/117060 A1 | 9/2009 |
| WO | 2009/154990 A2 | 12/2009 |
| WO | 2010/092009 A1 | 8/2010 |
| WO | 2010/099141 A1 | 9/2010 |
| WO | 2011/044090 A2 | 4/2011 |
| WO | 2011/047111 A1 | 4/2011 |
| WO | 2012/027313 A1 | 3/2012 |
| WO | 2012/037727 A1 | 3/2012 |
| WO | 2012/044741 A1 | 4/2012 |
| WO | 2012/163052 A1 | 12/2012 |
| WO | 2013/016042 A1 | 1/2013 |
| WO | 2013/122752 A1 | 8/2013 |
| WO | 2013/126488 A1 | 8/2013 |
| WO | 2013/177016 A1 | 11/2013 |
| WO | 2014/151259 A1 | 9/2014 |
| WO | 2014/167447 A1 | 10/2014 |
| WO | 2014/179411 A1 | 11/2014 |
| WO | 2014/197894 A1 | 12/2014 |
| WO | 2015/047508 A1 | 4/2015 |
| WO | 2015/144883 A1 | 10/2015 |
| WO | 2015/197588 A1 | 12/2015 |
| WO | 2016/059320 A1 | 4/2016 |
| WO | 2016/073862 A2 | 5/2016 |
| WO | 2016/095213 A1 | 6/2016 |
| WO | 2016/100078 A1 | 6/2016 |
| WO | 2016/115288 A1 | 7/2016 |
| WO | 2016/123148 A1 | 8/2016 |
| WO | 2016/156610 A1 | 10/2016 |
| WO | 2016/168389 A1 | 10/2016 |
| WO | 2017/063107 A1 | 4/2017 |
| WO | 2017/146722 A1 | 8/2017 |
| WO | 2017/155754 A1 | 9/2017 |
| WO | 2017/178920 A1 | 10/2017 |
| WO | 2018/083561 A1 | 5/2018 |
| WO | 2018/175123 A1 | 9/2018 |
| WO | 2018/204864 A1 | 11/2018 |
| WO | 2019/005190 A2 | 1/2019 |
| WO | 2019/005191 A1 | 1/2019 |
| WO | 2019/005192 A1 | 1/2019 |
| WO | 2019/005193 A1 | 1/2019 |

(56) References Cited

FOREIGN PATENT DOCUMENTS

| | | |
|---|---|---|
| WO | 2019/005194 A1 | 1/2019 |
| WO | 2019/005195 A1 | 1/2019 |
| WO | 2019/005196 A1 | 1/2019 |
| WO | 2019/005197 A1 | 1/2019 |
| WO | 2019/005198 A1 | 1/2019 |
| WO | 2019/005199 A1 | 1/2019 |
| WO | 2019/005200 A1 | 1/2019 |
| WO | 2019/005201 A1 | 1/2019 |
| WO | 2019/005202 A1 | 1/2019 |
| WO | 2019/005203 A1 | 1/2019 |
| WO | 2019/005204 A1 | 1/2019 |
| WO | 2019/006176 A1 | 1/2019 |
| WO | 2019/036339 A1 | 2/2019 |
| WO | 2019/126333 A1 | 6/2019 |
| WO | 2019/195652 A1 | 10/2019 |
| WO | 2020/101850 A1 | 5/2020 |

OTHER PUBLICATIONS

Clearfield, "Fieldshield Optical Fiber Protection System: Installation Manual." for part No. 016164. Last Updated Dec. 2014. 37 pgs.
Clearfield, "FieldShield SC and LC Pushable Connectors," Last Updated Jun. 1, 2018, 2 pgs.
Clearfield, "FieldShield SmarTerminal: Hardened Pushable Connectors" Last Updated Jun. 29, 2018, 2 pgs.
Coaxum, L. et al., U.S. Appl. No. 62/341,947, "Fiber Optic Multiport Having Different Types of Ports for Multi-Use," filed May 26, 2016.
Corning Cable Systems, "SST Figure-8 Drop Cables 1-12 Fibers", Preliminary Product Specifications, 11 pgs. (2002).
Corning Cable Systems, "SST-Drop (armor) Cables 1-12 Fibers", Product Specifications, 2 pgs. (2002).
Corning Cable Systems, "SST-Drop (Dielectric) Cables 1-12 Fibers", Product Specifications, 2 pgs. (2002).
Faulkner et al. "Optical networks for local lopp applications," J. Lightwave Technol.0733-8724 7(11), 17411751 (1989).
Fiber Systems International: Fiber Optic Solutions, data, "TFOCA-11 4-Channel Fiber Optic Connector" sheet. 2 pgs.
Infolite—Design and Data Specifications, 1 pg. Retrieved Feb. 21, 2019.
Nawata, "Multimode and Single-Mode Fiber Connectors Technology"; IEEE Journal of Quantum Electronics, vol. QE-16, No. 6 Published Jun. 1980.
Ramanitra et al. "Optical access network using a self-latching variable splitter remotely powered through an optical fiber link," Optical Engineering 46(4) p. 45007-1-9, Apr. 2007.
Ratnam et al. "Burst switching using variable optical splitter based switches with wavelength conversion," ICIIS 2017—Poeceedings Jan. 2018, pp. 1-6.
Schneier, Bruce; "Applied Cryptography: Protocols, Algorithms, and Source Code in C," Book. 1995 Sec. 10.3, 12.2, 165 Pgs.
Stratos: Lightwave., "Innovation Brought to Light", Hybrid HMA Series, Hybrid Multi Application, 2 pgs.
Wang et al. "Opto-VLSI-based dynamic optical splitter," Electron. Lett.0013-5194 10.1049/el:20046715 40(22), 14451446 (2004).
Xiao et al. "1xN wavelength selective adaptive optical power splitter for wavelength-division-multiplexed passive optical networks," Optics & Laser Technology 68, pp. 160-164, May 2015.
Wang et al. "Opto-VLSI-based dynamic optical splitter," Electron. Lett.0013-5194 10.1049/el:120046715 40(22), 14451446 (2004).
Liu et al., "Variable optical power splitters create new apps", Retrieved from: https://www.lightwaveonline.com/fttx/pon-systems/article/16648432/variable-optical-power-splitters-create-new-apps, 2005, 14 pages.
Chinese Patent Application No. 201980084023.6, Office Action, dated May 24, 2022, 4 pages, Chinese Patent Office.

* cited by examiner

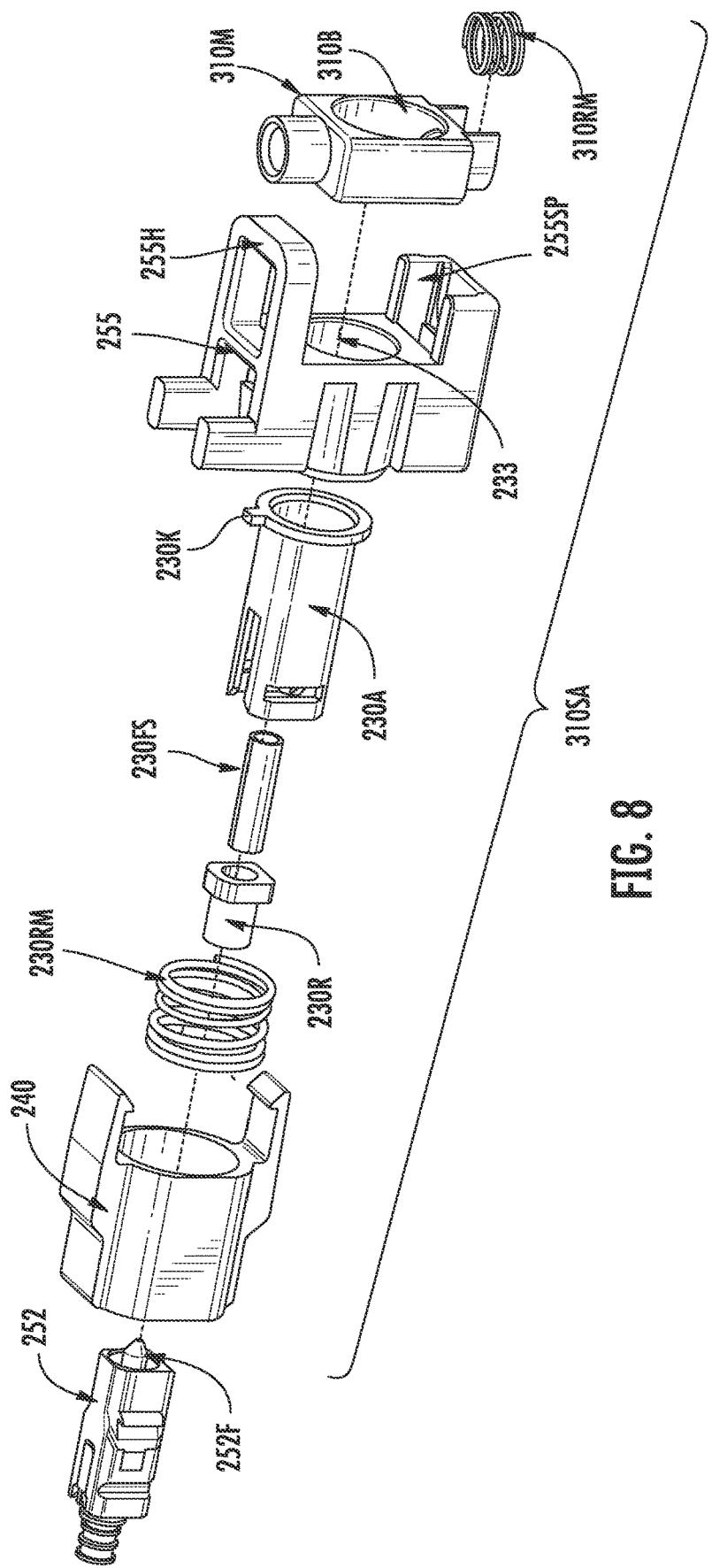

FIBER OPTIC TERMINALS HAVING ONE OR MORE LOOPBACK ASSEMBLIES

CROSS REFERENCE TO RELATED APPLICATIONS

This application claims the benefit of priority under 35 U.S.C. § 119 of U.S. Provisional Application Ser. No. 62/972,958 filed Feb. 11, 2020, the content of which is relied upon and incorporated herein by reference in its entirety.

FIELD

The disclosure is directed to fiber optic terminals having at least one loopback assembly comprising a loopback optical fiber providing optical communication between a first output connection port and a second output connection port of the terminal along with fiber optic networks using the fiber optic terminals.

BACKGROUND

Optical fiber is increasingly being used for a variety of applications, including but not limited to broadband voice, video, and data transmission. As bandwidth demands increase optical fiber is migrating deeper into communication networks such as in fiber to the premises applications such as FTTx, 5G and the like. As optical fiber extends deeper into communication networks there exist a need for building more complex and flexible fiber optic networks in a quick and easy manner along with testing ability of optical links in the network.

Optical terminals such as multiports or closures were developed for making one or more plug and play optical connections with hardened connectors such as the OptiTap® plug connector. The terminals allow the distribution of optical signals within an optical network and provide the flexibility of locating the terminals in convenient locations for efficient network design and deployment and also deferring connectivity and the associated expense until needed in the communication network. Terminals typically have an input cable or input port that receives an optical connector along with a plurality of output ports or receptacles that receive an external connector for making an optical connection with respective internal connectors of the terminal. Consequently, the terminals allow the network operator to make plug and play optical connections when desired by accessing the receptacle or port and optically connecting a link such as a branch cable, drop cable, 5G device or the like to the communication network.

Illustratively, FIG. 1 shows a conventional fiber optic multiport 1 having an input fiber optic cable 4 carrying one or more optical fibers to internal connectors disposed inside and protected by housing or shell 3. The multiport 1 receives the optical fibers from fiber optic cable 4 and distributes the optical fibers to respective receptacles or ports 7 for optical connection with an external connector. In this device, the receptacles or ports 7 are separate assemblies attached through a wall of housing 3 of the multiport 1. The receptacles or ports 7 allow mating with external connectors attached to drop or branching cables (not shown) such as drop cables for "fiber-to-the-home", 5G devices, or other suitable applications. During use, optical signals pass through the branch cables, to and from the fiber optic cable 4 by way of the optical connections at the receptacles or ports 7 of multiport 1. Fiber optic cable 4 may also be terminated with a fiber optic connector 5.

Terminals such as multiport 1 allow quick and easy deployment by network operators and along with the ability to defer optical connectivity and overbuild the communication network for future growth. However, the network operator may desire to test the terminals in the communication network to ensure that portions of the network are still operational such as after storms or during reported network outages to verify whether that portion of the network is operational or not. The network operator could send a service truck with a technician to the site for physical inspection and testing, but this type of testing is expensive and time-consuming. As an alternative to sending a technician, manufacturers have used optical reflectors in optical networks to send test signals and look for a reflective event to test an optical link. However, these reflectors have limitations and may require special equipment to analyze the return optical signals. For instance, reflectors may only operate at a given wavelength and the operating wavelength needs to be known for testing.

Consequently, there exists an unresolved need for terminals that provide quick and easily deployment for the fiber optic network in a flexible manner while also addressing concerns related to testing of the terminals installed into the fiber optic network in a quick, easy and reliable manner.

SUMMARY

The disclosure is directed to fiber optic terminals (hereinafter "terminals") comprising a loopback assembly installed in the terminal along with fiber optic networks using the terminal. One aspect of the disclosure is directed to a fiber optic terminal comprising a shell having a cavity, one or more input optical fibers disposed within the cavity of the shell, a first output connection port of the fiber optic terminal, a second output connection port of the fiber optic terminal, and at least one loopback assembly. The first output connection port is in optical communication with the one or more input optical fibers and the second output connection port is in optical communication with one or more of the input optical fibers. The loopback assembly comprises a loopback optical fiber with a first fiber optic connector terminated on a first end of the loopback optical fiber, and a second fiber optic connector terminated on a second end of the loopback optical fiber. The first fiber optic connector is attached to the first output connection port and the second fiber optic connector is attached to the second output connection port so that the first output connection port is in optical communication with the second output connection port by way of the loopback optical fiber. The concepts disclosed herein may be used with any suitable type of output connection port on the terminal along with fiber optic connectors that cooperate with the ports. For instance, the fiber optic connectors may be attached using bayonets, threads, push and click or other suitable attachment.

Another aspect of the disclosure is directed to a fiber optic terminal comprising a shell having a cavity, one or more input optical fibers disposed within the cavity of the shell, a first output connection port of the fiber optic terminal, a second output connection port of the fiber optic terminal, and at least one loopback assembly. The first output connection port is in optical communication with the one or more input optical fibers, and the first output connection port further comprises a securing feature biased to a retain position by a resilient member. The second output connection port is in optical communication with one or more of the input optical fibers, and the second output connection port further comprises a securing feature biased to a retain position by a resilient member. The loopback assembly comprises a loopback optical fiber with a first fiber optic connector terminated on a first end of the loopback optical fiber, and a second fiber optic connector terminated on a second end of the loopback optical fiber. The first fiber optic connector is attached to the first output connection port and the second fiber optic connector is attached to the second output connection port so that the first output connection port is in optical communication with the second output connection port by way of the loopback optical fiber.

A further aspect of the disclosure is directed to a fiber optic network comprising a terminal and a first optical link in optical communication with one or more input optical fibers of the terminal. The terminal comprises a shell having a cavity, one or more input optical fibers disposed within the cavity of the shell, a first output connection port of the fiber optic terminal, a second output connection port of the fiber optic terminal, and at least one loopback assembly. The first output connection port is in optical communication with the one or more input optical fibers and the second output connection port is in optical communication with one or more of the input optical fibers. The loopback assembly comprises a loopback optical fiber with a first fiber optic connector terminated on a first end of the loopback optical fiber, and a second fiber optic connector terminated on a second end of the loopback optical fiber. The first fiber optic connector is attached to the first output connection port and the second fiber optic connector is attached to the second output connection port so that the first output connection port is in optical communication with the second output connection port by way of the loopback optical fiber.

Additional features and advantages will be set forth in the detailed description which follows, and in part will be readily apparent to those skilled in the art from that description or recognized by practicing the same as described herein, including the detailed description that follows, the claims, as well as the appended drawings.

It is to be understood that both the foregoing general description and the following detailed description present embodiments that are intended to provide an overview or framework for understanding the nature and character of the claims. The accompanying drawings are included to provide a further understanding of the disclosure, and are incorporated into and constitute a part of this specification. The drawings illustrate various embodiments and together with the description serve to explain the principles and operation.

BRIEF DESCRIPTION OF THE FIGURES

FIG. 8 is an exploded view of the modular adapter sub-assembly of FIG. 7 along with the internal connector of the terminal;

DETAILED DESCRIPTION

Figure 1:
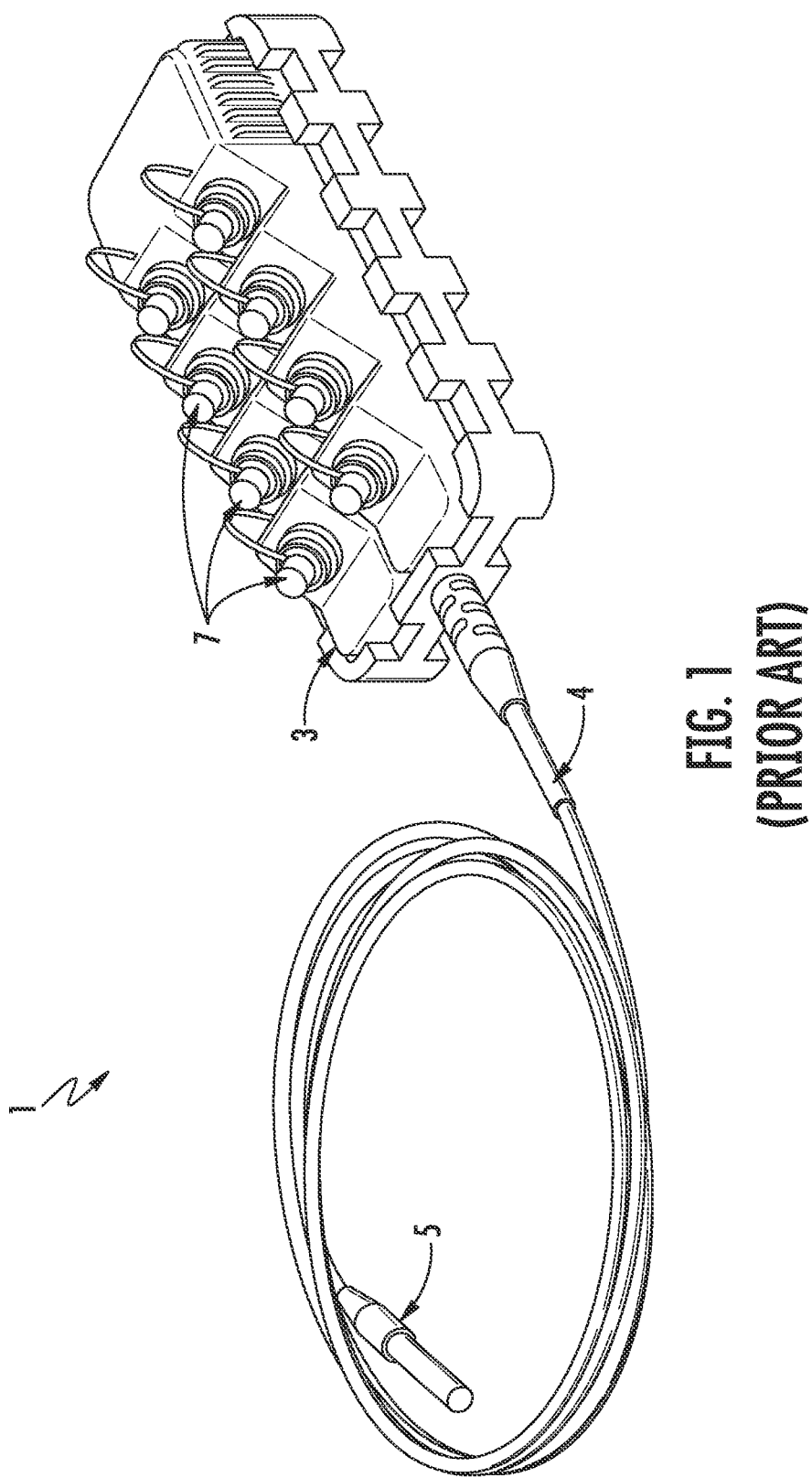
FIG. 1 is a prior art fiber optic terminal.

Reference will now be made in detail to the embodiments of the disclosure, examples of which are illustrated in the accompanying drawings. Whenever possible, like reference numbers will be used to refer to like components or parts.

The concepts disclosed are related to fiber optic terminals having at least one loopback assembly so that a first output connection port of the terminal is in optical communication with a second output connection port of the terminal along with fiber optic network using the terminal. The terminals disclosed allow for remote testing of the optical network by sending a test signal toward the terminal and determining whether a signal is returned or not, thereby determining whether that portion of the communication network is operating properly or if a service visit to the site is required. Further, different loopback assemblies in a terminal may have different characteristics to help the technician identify whether different optical pathways of the terminal are functional or not. Consequently, the fiber optic terminals (hereinafter "terminals") comprising the loopback assembly are well-suited for outside plant environments such as downstream from a central office location or the like, but other applications such as indoor use are possible using the concepts disclosed.

Still further, terminals and networks using the devices disclosed may have a wide wavelength range for suitable testing performance. In other words, the testing using the terminals disclosed may be accomplished using any suitable wavelength of signal that is suitably transmitted by network. Further, the terminals with the loopback assemblies disclosed herein may be assembled and shipped by the manufacturer and installed by the network operator as a complete assembly ready for installation and use. Generally speaking, the terminals disclosed and explained in the exemplary embodiments are multiports, but the concepts disclosed may be used with any suitable terminal such as closures, network interface devices, or the like having a plurality of output connection ports.

The concepts disclosed advantageously provide flexibility for the network operators and also reduce inventory concerns for the network operators since the need to stock a multitude of terminals or reflectors is not necessary. Instead, the network operator can order the terminals with the loopback assemblies installed and be ready to test the network from day one without having to order a compatible device, thereby providing simplicity. Moreover, the terminals disclosed provide flexibility and adaptability to alter the fiber optic network based on moves, adds or changes to the fiber optic network such as adding link such as drop cable for a customer or a 5G device by merely removing the loopback assembly and attaching a suitable device for connectivity. The concepts may be used with any suitable terminals and may be especially advantageous with terminals having compact form-factors. The concepts are scalable to any suitable count of input or outputs on a terminal in a variety of arrangements or constructions for building fiber optic networks.

For instance, the concepts disclosed herein are suitable for fiber optic networks such as for Fiber-to-the-location (FTTx) and 5G applications, and are equally applicable to other optical applications as well including indoor, industrial, wireless, or other suitable applications. Additionally, the concepts disclosed may be used with terminals having any suitable footprint or construction. Various designs, constructions, or features for fiber optic networks and terminals are disclosed in more detail as discussed herein and may be modified or varied as desired.

Figure 2:
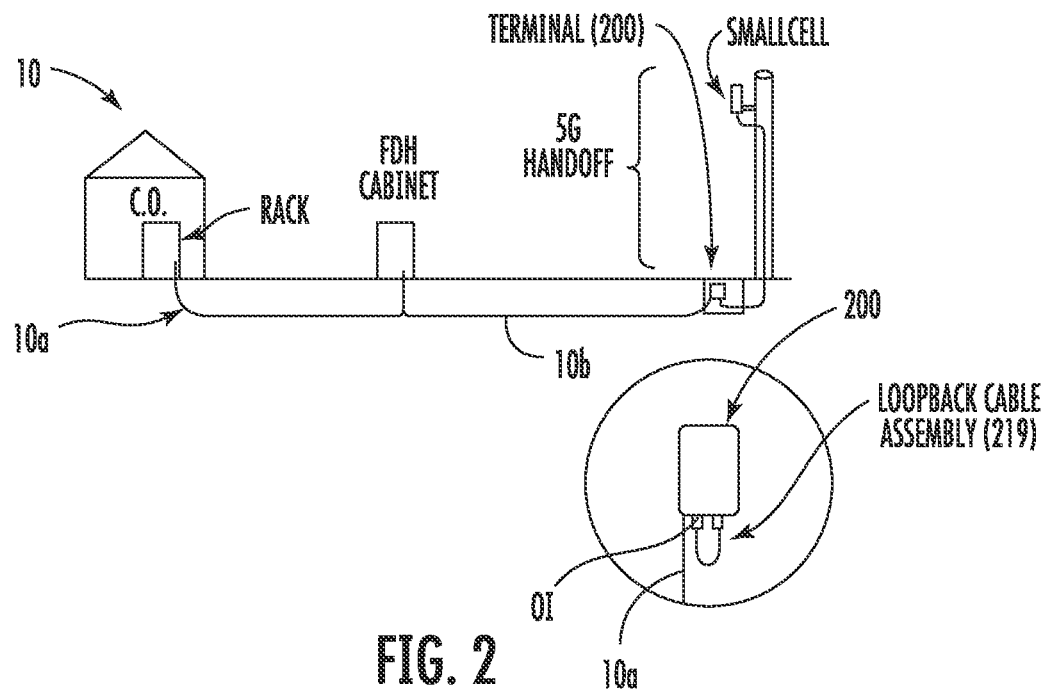
FIG. 2 is a schematic representation of a fiber optic network having a fiber optic terminal having a loopback assembly according to the concepts disclosed herein.
Figure 3:
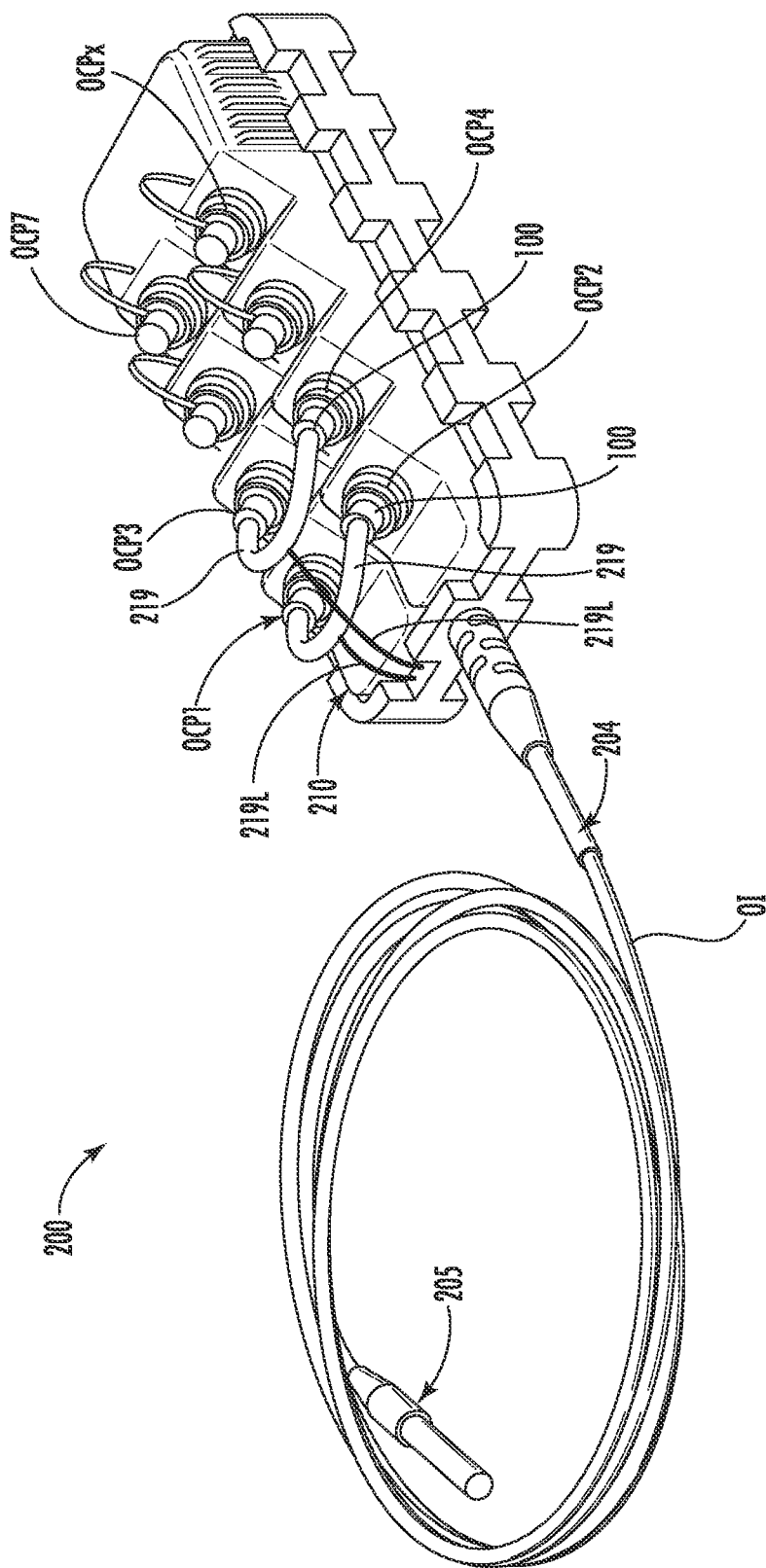
FIG. 3 depicts a fiber optic terminal with a loopback assembly according the concepts disclosed herein.
Figure 4:
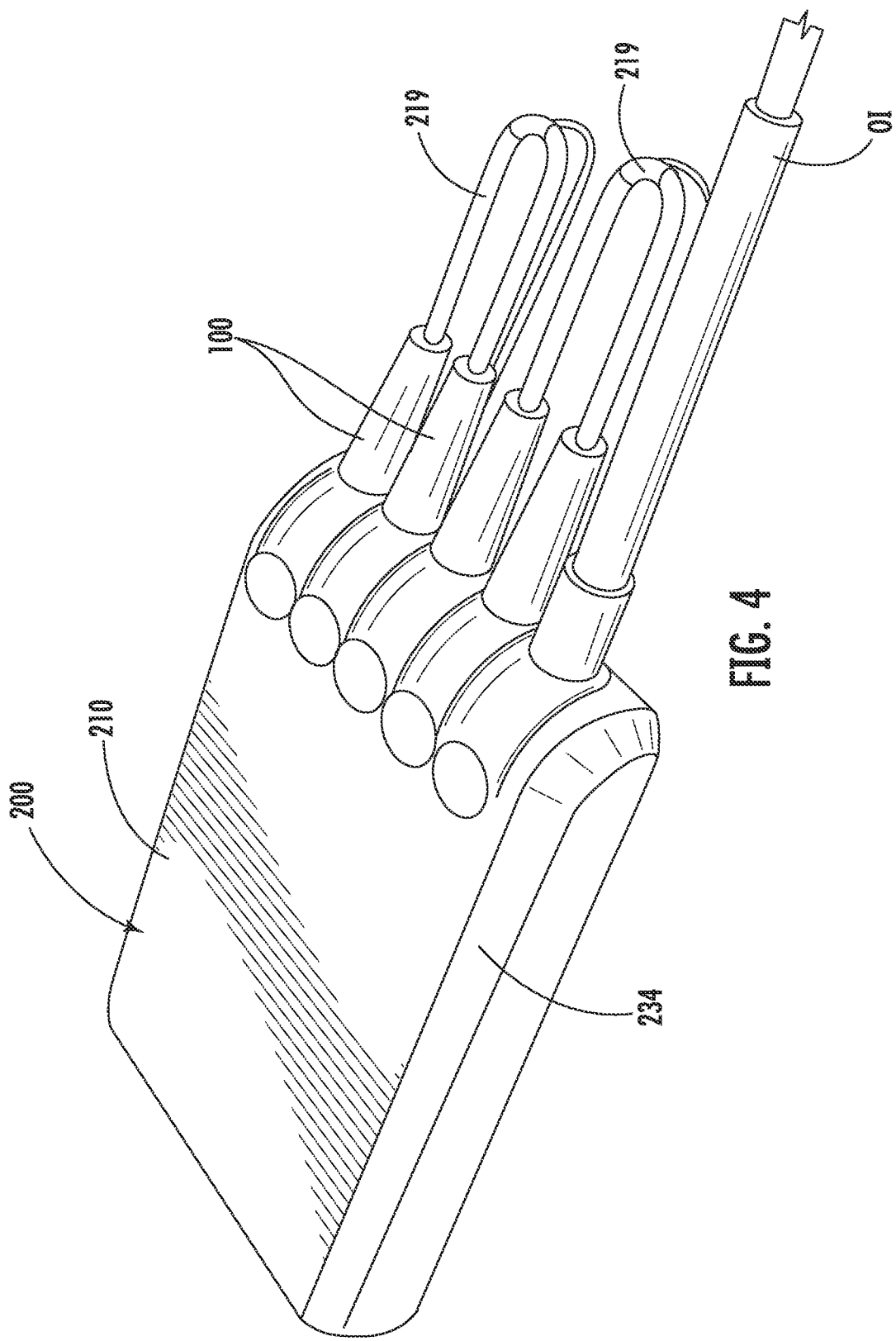
FIG. 4 is a perspective view of another explanatory fiber optic terminal comprising a loopback assembly.

FIG. 2 shows a schematic simplified view of a portion of an explanatory fiber optic network 10 such as for a fiber-to-the-home (FTTH) or 5G network comprising a terminal 200 having a loopback assembly 219 so that a first output connection port is in optical communication with any second output connection port using a loopback optical fiber 219F of the loopback assembly 219. However, the concepts maybe used with other networks. As depicted, an optical link 10a (e.g., a first fiber optic cable such as a feeder cable) is connected to a central office CO at a first end and a second end is routed to and in optical communication with equipment at a fiber distribution hub FDH such as a cabinet having a patch panel that acts as a distribution point for the communication network. A first end of a second optical link 10b (e.g., a second optical cable such as a distribution cable) is in communication with the equipment at the FDH and routes optical fibers deeper into the fiber optical network. In this case, a second end of optical link 10B provides one or more optical fibers that act as an optical input OI for terminal 200 as depicted. Terminal 200 has a plurality of output connection ports (OCP1-OCPx) such as shown in FIGS. 3 and 4).

Figure 2A:
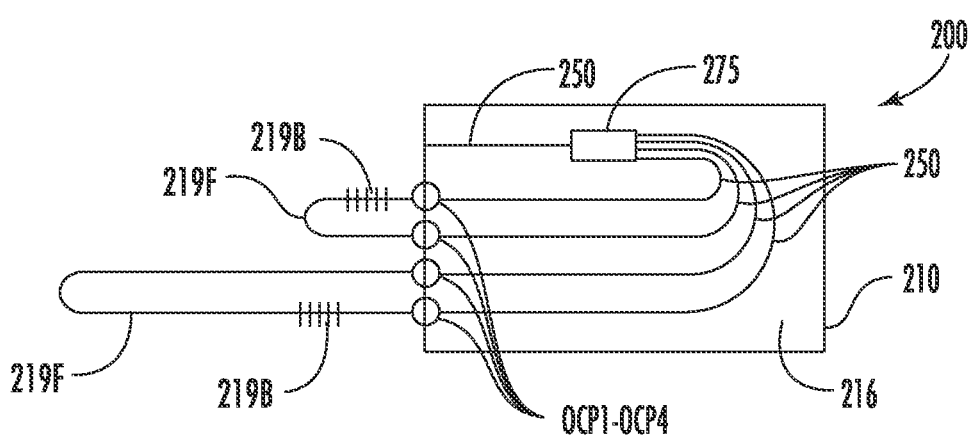
FIG. 2A is a schematic representation of a terminal having a loopback assembly.

As schematically shown in FIGS. 2 and 2A, terminal 200 comprises two loopback assemblies 219. In other words, a first output connection port OCP1 is in optical communication with second output connection port OCP2 using the first loopback optical fiber of the first loopback cable assembly 219. Likewise, a third output connection port OCP3 is in optical communication with a fourth output connection port OCP4 using a second loopback optical fiber of the second loopback assembly 219. Furthermore, loopback assemblies may optically connect any desired output connection ports. By way of explanation, OCP1 (or any other OCPx) may be in optical communication with any other suitable OCPx such as the loopback assembly optically connecting OCP1-OCP2, OCP1-OCP3, OCP1-OCP4 or OCP1-OCPx. Additionally, other output connection ports of terminal 200 may be in optical communication with other devices such as a small cell as shown or a drop cable for providing service to a subscriber.

As depicted in FIG. 2A, the respective loopback optical fibers 219F of the two different loopback assemblies 219 may have different lengths so that the technician may distinguish between the two different links during testing.

By way of example and not limitation, a first loopback optical fiber 219F may have a length of 50 centimeters, and second loopback optical fiber 219F may have a length of 150 centimeters so the testing reveals to different path lengths in the return optical test signal. Stated another way, the second loopback optical fiber comprises a length that is 50 centimeters or longer than the first loopback optical fiber. This differential length between the loopback optical fibers 219F allows the technician to distinguish between the different links due to the different lengths the test signal travels during testing.

Likewise, the different loopback assemblies may have other distinct features to aid the technician in distinguishing among the different optical links during testing. For instance, the loopback optical fiber 219F may comprise a Bragg grating 219B such as depicted in FIG. 2A for reflecting an optical test signal back to the technician if desired or not. For instance, the Bragg grating 219B may be formed on the loopback optical fiber to reflect a specific wavelength such as 1625 nm or 1650 nm back toward the technician. Thus, a first loopback optical fiber may a Bragg grating with a reflection event at 1625 nm and the second loopback optical fiber may have a Bragg grating with a reflection event at 1650 nm, thereby allowing the technician to distinguish between different links by the wavelength of the return reflection. In addition or alternatively, the Bragg gratings on the first and second loopback optical fibers 219B may be located at different distances from a first end of the loopback optical fibers. For instance, the first loopback optical fiber 219B may has a Bragg grating 219B located within 10 centimeters of the first end of the first loopback optical fiber 219B, and the second loopback optical fiber 219B may has a Bragg grating 219B located at a distance of 100 centimeters of the first end of the second loopback optical fiber 219B. FIG. 2A schematically depicts the Bragg grating of the second loopback optical fiber disposed at a distance of 50 centimeters or greater from the first end of the second loopback optical fiber. Of course, the above-mentioned are merely explanatory examples, and other suitable lengths of loopback optical fibers and/or locations for Bragg gratings are possible with the concepts disclosed herein along with other reflective structures or wavelengths.

Loopback assembly 219 having loopback optical fiber 219F may have any suitable construction that optically connects a first output connection port with a second output connection port. For instance, loopback assembly 219 may be configured as a cable assembly or configured as a module. No matter the configuration, the loopback assembly comprises respective first and second optical connectors that may be attached to respective first and second output connection ports of the terminal 200.

FIG. 3 depicts a representative terminal 200 comprising at least one optical input OI and a plurality of output connection ports OCP1-OCPx along with one or more loopback assemblies 219. Terminal 200 comprises a shell 210 having a cavity (not visible) with one or more input optical fibers (not visible) disposed within the cavity. In this terminal 200, the output connection ports OCP1-OCPx are receptacles that mount through the wall of the shell 210, but other configurations are possible for the output connection ports. Moreover, the fiber optic connectors 100 of loopback assembly 219 are attached to the respective output connection ports using a threaded fastener. One such example of such a fiber optic connector 100 having a threaded fastener is an OPTI-TAP® connector available from Corning Optical Communications of Charlotte, N.C.; however, other suitable types of attachment are possible with the concepts disclosed such as bayonet quick-turn attachments or push-pull attachments. The optical input OI may comprise an input cable 204 comprising one or more input optical fibers that enter the cavity of terminal 200 as shown. Alternatively, terminals 200 may comprise an input connection port that comprises a port opening or receptacle for receiving a fiber optic connector such shown in FIGS. 4 and 5. Loopback assemblies 219 may also comprise a lanyard 219L that attaches the loopback assembly 219 to the terminal 200 so that the assembly is not lost or misplaced. Thus, the loopback assembly may also act as a dust plug for the output connection ports of the terminal 200.

The concepts disclosed herein may be used with any suitable terminal comprising one or more inputs, outputs or pass-throughs. Generally speaking, the terminals 200 disclosed herein comprise a shell 210 comprising a cavity 216 with at least one input optical fiber disposed within the cavity of the shell along with a first output connection and a second output connection port. The loopback assembly comprises a loopback optical fiber. A first fiber optic connector is terminated on a first end of the loopback optical fiber, and a second fiber optic connector is terminated on a second end of the loopback optical fiber. The first and second optical connectors of the loopback assembly are respectively attached to the first and second output connection ports of the terminal so that the first output connection port of the terminal is in optical communication with second output connection port of the terminal using a loopback optical fiber of the loopback assembly.

Consequently, a test signal sent by a technician along an optical link 10a,10b connected to optical input of the terminal may be routed to the first output connection port (OCP1) and through the loopback optical fiber (219F) of the loopback assembly (219) and into the second output connection port (OCP2) so that the optical test signal may be returned to the technician along the optical link 10a,10b to confirm that a portion of the terminal is operational. For instance, as shown in FIG. 2 a technician may use a OTDR to transmit a test signal along optical link 10a toward the FDH that routes the test signal along optical link 10b toward the optical input OI of terminal 200. The test signal enters the input optical fiber 250 of terminal 200 and travels to the first output connection port (OCP1) and into the first end of loopback optical fiber 219F that is in optical communication with the first output connection port (OCP1). From there a portion of the test signal may be reflected back (i.e, a specific wavelength such as 1625 nm or 1650 nm) to the technician along the transmit path by the Bragg grating 219B on the loopback optical fiber 219F if the Bragg grating 219B is present. The other wavelengths of the test signal (or the original test signal if no Bragg grating) is sent to the second output connection port (OCP2) from the second end of the loopback optical fiber 219F that is in optical communication with the second output connection port (OCP2) and back to the technician along the return path if the terminal is operational. Alternatively, the technician may use a OTDR to transmit a test signal from the FDH along optical link 10b toward the terminal 200 for a similar testing procedure. Thus, the concepts disclosed allow the technician to advantageously test and monitor the terminal 200 and optical network without having to make a site visit to the terminal, thereby saving time and the expense of a site visit. Moreover, the technician may test other suitable portions of the optical network and/or other terminals using the concepts disclosed herein.

The output connection ports may include any suitable mating mechanism or geometry for securing the external connector to the terminal. Although, these concepts are described and illustrated with respect to terminals configured as multiports the concepts may be used with any other suitable terminals having output connection ports such as closures, network interface devices, wireless devices, distribution point unit or other suitable devices.

In some embodiments, the connection ports of the terminal may have a push-and-retain connection without the use of threaded coupling nuts or quick turn bayonets for securing the external connectors. This allows for terminals with connection ports that are closely spaced together and may result in relatively small terminals since the room needed for turning a threaded coupling nut or bayonet is not necessary. The compact form-factors may allow the placement of the terminals in tight spaces in indoor, outdoor, buried, aerial, industrial or other applications while providing at least one connection port that is advantageous for a robust and reliable optical connection in a removable and replaceable manner. The disclosed terminals may also be aesthetically pleasing and provide organization for the optical connectors in manner that the prior art terminals cannot provide. However, the external fiber optic connectors may be secured to the terminal using any suitable structures such as threads, bayonets or other suitable mating geometry for attaching to the connector ports of the terminal.

FIG. 4 depicts another terminal 200 comprising output connection ports OCPx extending from an outer surface 234 of the terminal 200 into the cavity 216 and defines a port passageway 233 along a longitudinal axis. Terminals 200 such as shown in FIG. 4 may also have a dense spacing of optical connection ports OCP for receiving external optical connectors if desired or not. These types of terminals advantageously allow a relatively dense and organized array of connection ports in a relatively small form-factor while still being rugged for demanding environments; however terminals of any size or shape are possible using the concepts disclosed. As optical networks increase densifications and space is at a premium, the robust and small-form factors for devices such as terminals depicted herein becomes increasingly desirable for network operators.

Figure 5:
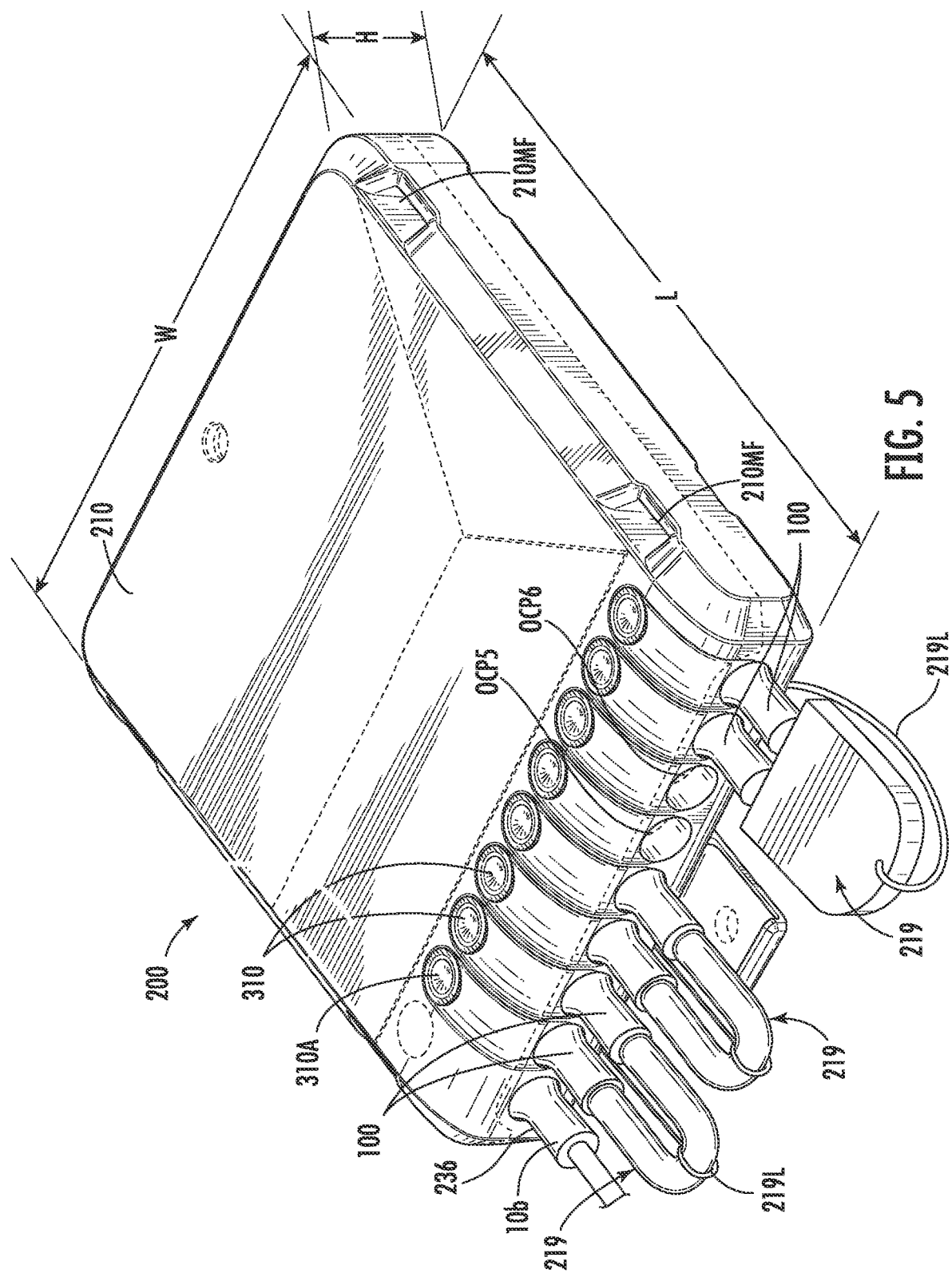
FIG. 5 is a perspective view of still another explanatory fiber optic terminal having a loopback assembly similar to the fiber optic terminal of FIG. 4, but with an input cable and a different number of output connection ports.
Figure 6:
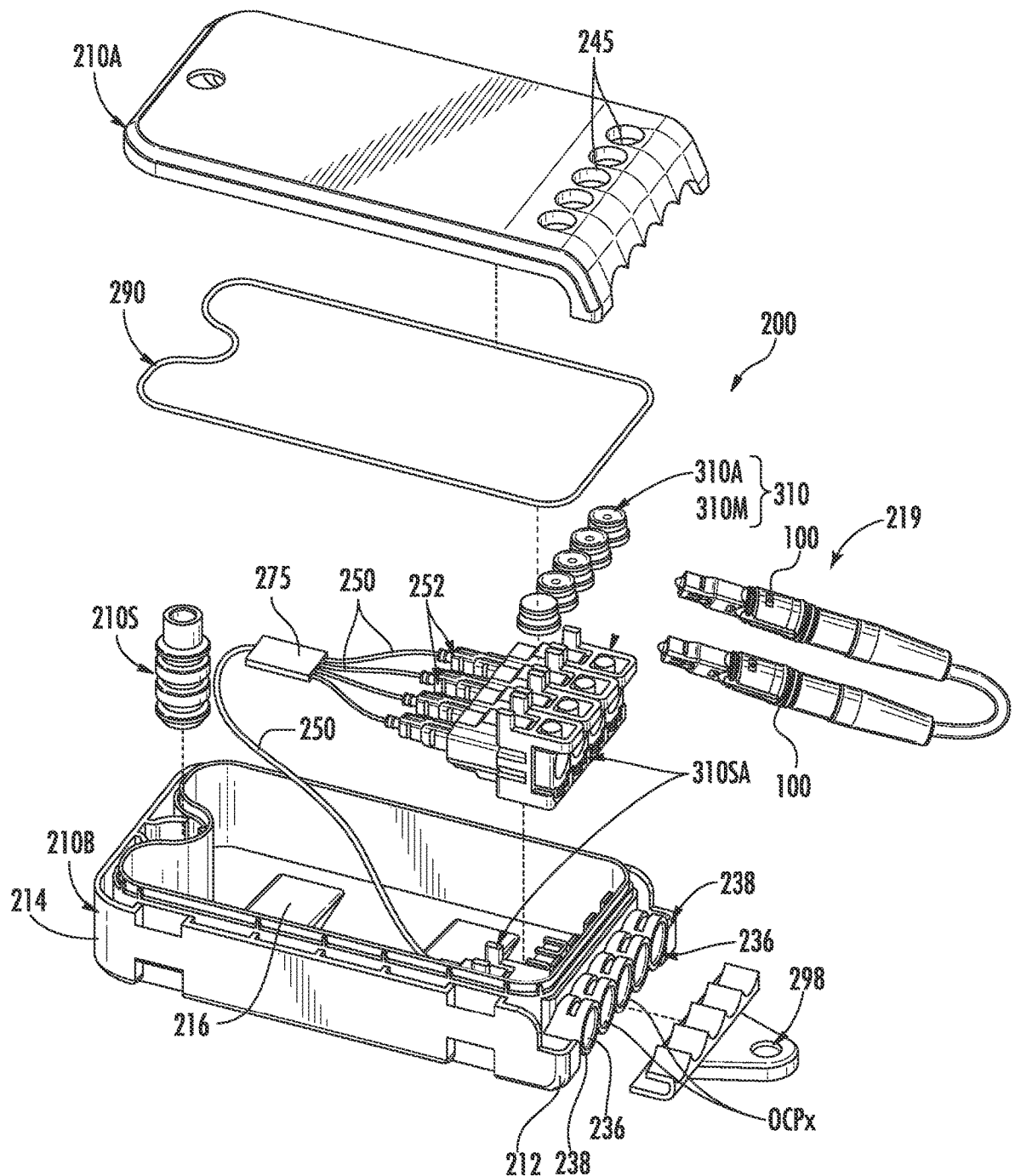
FIG. 6 is a partially exploded view of an explanatory terminal showing further details of a specific construction for terminals.

Returning to the explanatory terminals 200 depicted in FIGS. 4-6 comprising a loopback assembly 219. FIG. 4 depicts terminal 200 comprising an input connection port 236 and four output connection ports OCP1-OCP4 that are in optical communication using two loopback assemblies 219 having respective fiber optic connectors 100 such as shown in FIGS. 12-15 for making an optical connection with the terminal 200. More specifically, output connection ports OCP1 and OCP2 are in optical communication using a first loopback assembly comprising first loopback optical fiber 219F and output connection ports OCP3 and OCP4 are in optical communication using a second loopback assembly comprising second loopback optical fiber 219F.

FIG. 5 depicts another explanatory terminal 200 that comprises at least one optical input configured as input connection port 236. In this construction, the terminal 200 comprises an optical link 10b configured as a fiber optic cable that is secured to the input connection port 236 as a tether cable and optically connected to the optical input (01). In other words, the fiber optic cable is not intended to be removable from the input connection port 236. The other end of the tether cable may be terminated with a suitable fiber optic for optical connectivity to the fiber optic network.

Terminal 200 of FIG. 5 comprises eight output connection ports OCP1-OCP8, but terminals 200 may use any suitable number of output connection ports as desired. When the respective loopback assemblies 219 are removed, the output connection ports OCPx may be optically connected to drop cables or other devices having a suitable connector for routing the optical signals toward the subscribers or other equipment. Terminal 200 of FIG. 5 depicts another loopback assembly comprising first and second fiber optic connector for providing optical communication between output connection ports. In this embodiment, the loopback assembly 219 on the right-side is configured as a module having the loopback optical fiber 219F disposed within a housing. Configuring the loopback assembly 219 as a module provides the advantage of storing longer lengths of the loopback optical fiber 219F in a compact package and provide a cleaner and sleeker look for the terminal. By way of explanation, the module may have a housing with a two-piece shell that allows the length of the loopback optical fiber 219F to be coil and stored for protection. Additionally, the first and second fiber optic connectors 100 of the loopback assembly 219 may be securing to the housing and provide an easy to manipulate package for plug and play connectivity. The loopback assemblies 219 may also comprise a tether 219L so connected to the terminal 200 so that the loopback assemblies are not lost or damaged.

Figure 7:
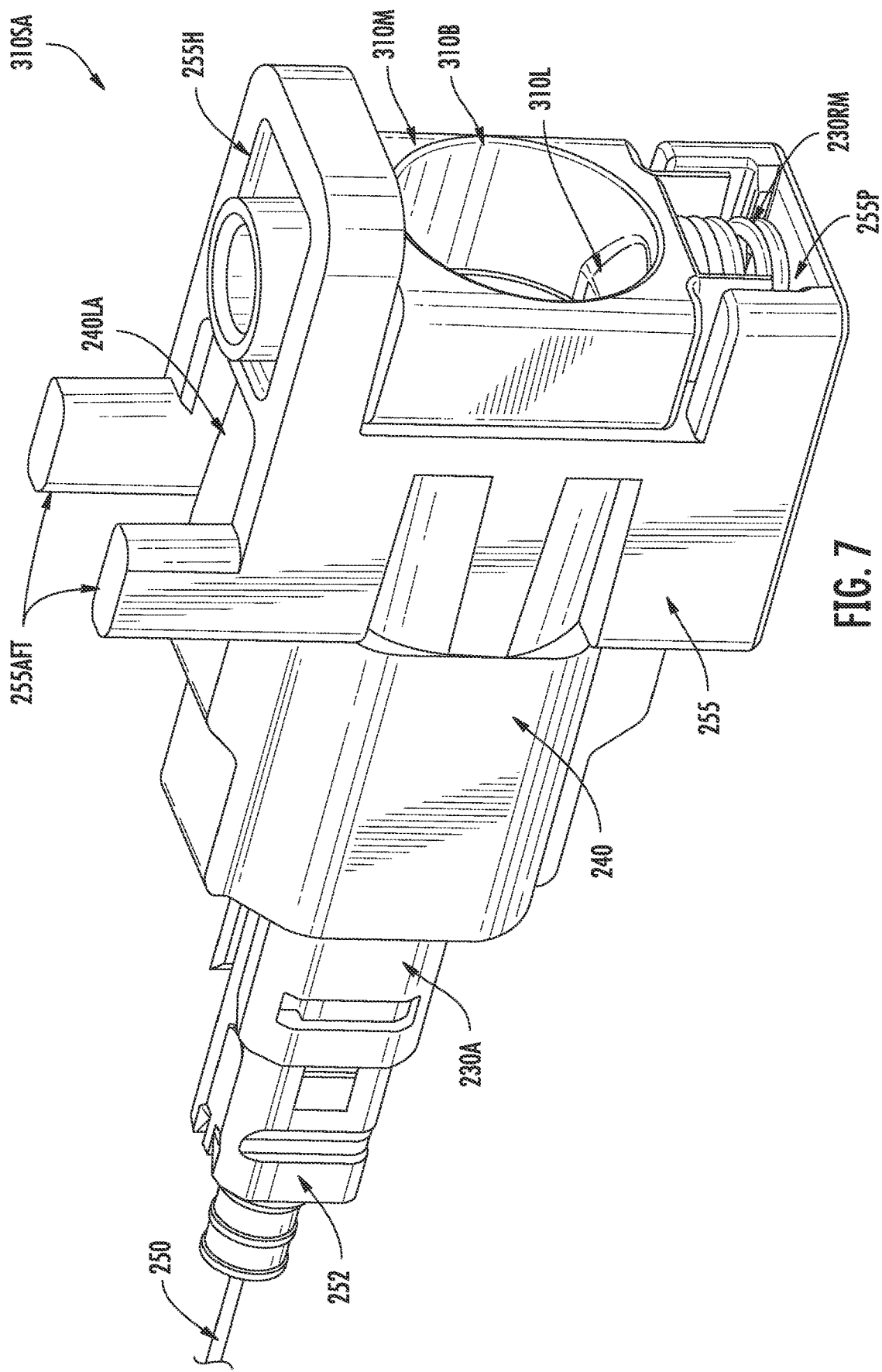
FIG. 7 is an assembled perspective view of the modular adapter sub-assembly associated with the respective output connection ports of the terminal of FIG. 6 for receiving an external fiber optic connector to mate with the internal connector of the terminal.

FIG. 6-8 depict details of a representative construction for the terminals 200. In further explanation the terminals 200 of FIGS. 4-6, comprises a shell 210 with a cavity 216 along with a securing feature 310 comprising a securing member 310M associated with the port passageway 233. As described herein, the input connection port 236 or pass-through connection ports may have a similar structure to the output connection ports OPC, and may use similar fiber optic connectors of the loopback assembly 219 for optical communication with the ports. The input connection port 236, and pass-through connection ports each comprises a port opening extending from an outer surface of the terminal 200 into the cavity 216 of the terminal 200 and each port respectively defines a port passageway along a longitudinal axis. Each port 236, OCPx has a respective securing member 310M is associated with port. Each securing member 310M comprises a bore 310B suitable for receiving and securing a portion of the housing 20 of the fiber optic connector of the respective optical link such as depicted with the input optical link 10a inserted into the input connection port 236. Likewise, the output connection ports OCP where used may have a similar construction as described for the input connection port 260 and pass-through connection ports if used. Terminals 200 may also advantageously use the securing members 310M for releasably connecting the external fiber optic connectors 100 of the optical links in the respective connection ports using an actuator 310A of securing feature 310.

Figure 11:
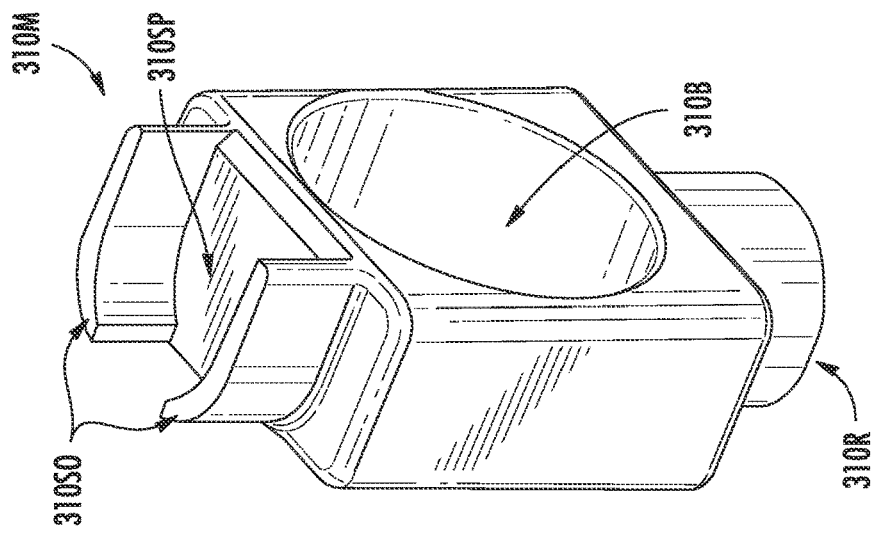
FIGS. 9-11 are various views showing the details of the securing member of FIGS. 7 and 8
Figure 10:
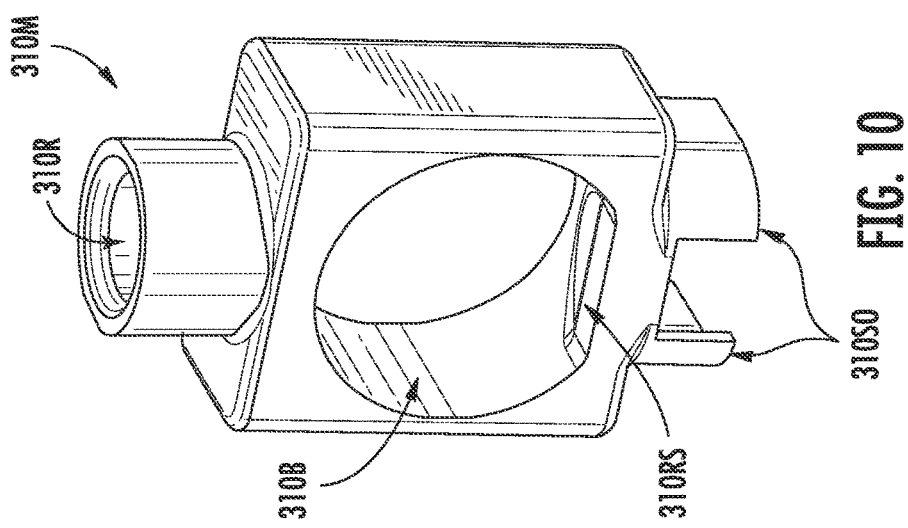
Figure 9:
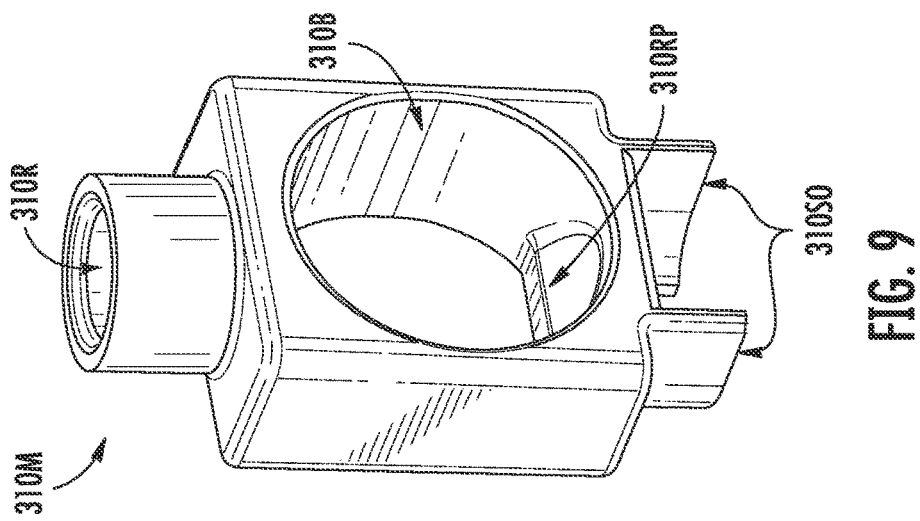
Figure 12:
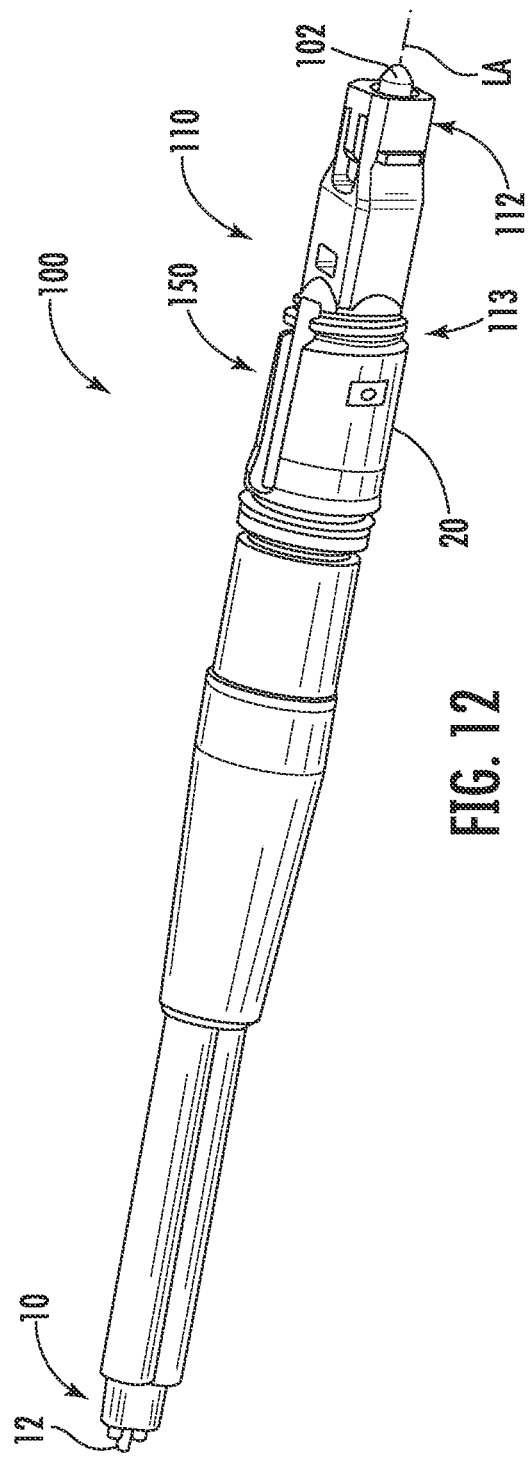
FIG. 12 is a perspective view of a portion of the loopback assembly having a fiber optic connector suitable for making an optical connection with an output connection port of a terminal.
Figure 13:
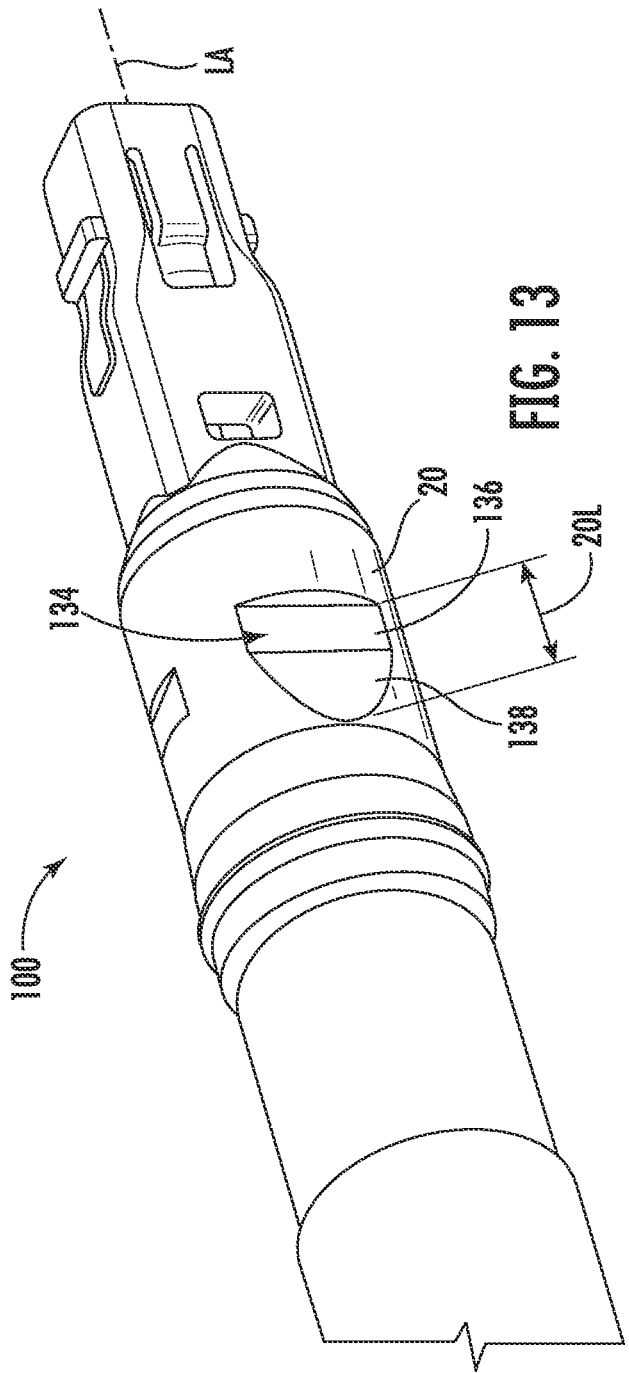
FIG. 13 is a perspective view showing the locking feature of the fiber optic connector of FIG. 12 that cooperates with the securing member of the fiber optic terminal.
Figure 14:
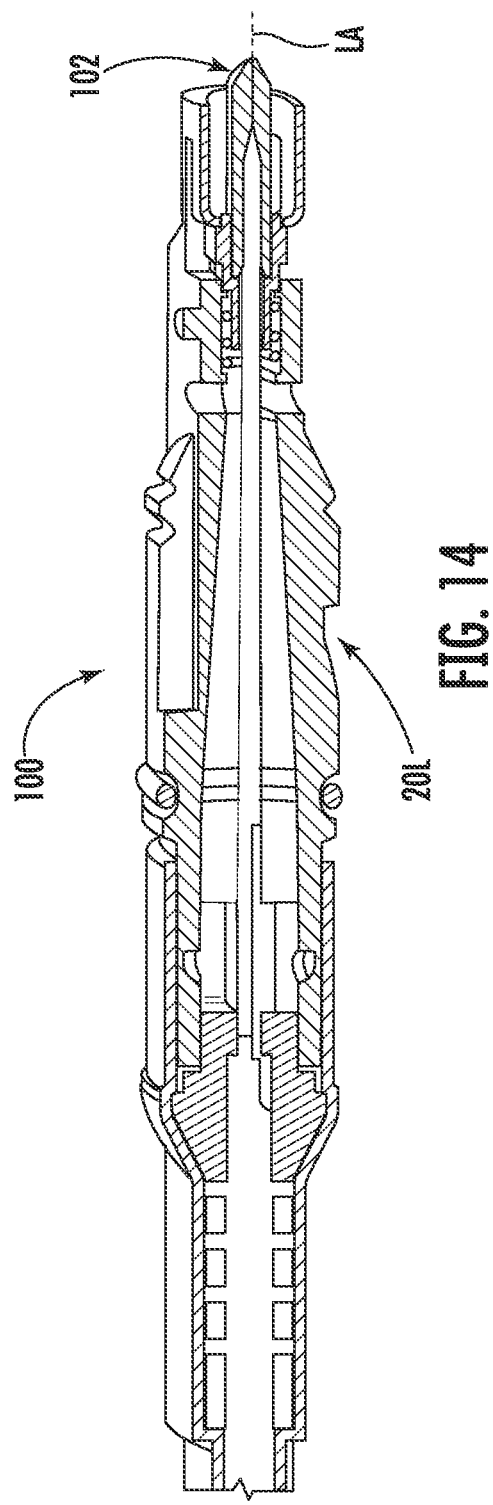
FIG. 14 is a cross-sectional view of a portion of the loopback assembly of FIG. 12.
Figure 15:
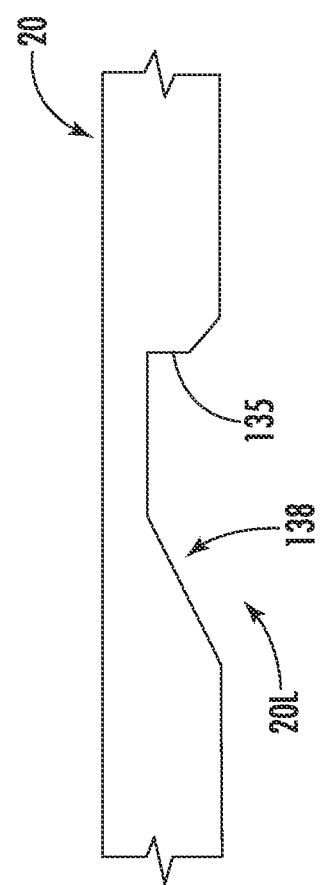
FIG. 15 is a detail cross-sectional view of the locking feature of the fiber optic connector of FIG. 12.

FIG. 6 is an exploded view showing details of terminals 200, and FIGS. 7 and 8 show an exploded view of a modular sub-assemblies 310SA associated with respective ports 236, OCPx for releasably securing the external fiber optic connector. Terminal 200 of FIG. 6 comprises an input connection port 236 and output connection ports OCPx configured for receiving external fiber optic connector 100 of the loopback assembly 219, and the pass-through output connection port may comprises an optical link configured as a fiber optic cable that is secured to the pass-through connection port as a tether cable. FIGS. 9-11 depict securing member 310M comprising a locking feature 310L and will be discussed in further detail. The securing member 310M may be used with a securing feature 310 for releasably attaching an external fiber optic connector 100 of an optical link 10 or a drop cable attached to output connection port.

Specifically, each port that may receive an external fiber optic connector 100 comprises securing member 310M having a locking feature 310L that cooperates with locking feature 20L of housing 20 of respective fiber optic connector 100 when the housing 20 is fully-inserted into the respective connection port for securing the connector. The housing 20 of fiber optic connector 100 may have a cooperating geometry that engages the locking feature 310L of securing member 310M of terminal 200. As best shown in FIGS. 9 and 10 depicted, locking feature 310L of securing member 310M comprises a ramp 310RP. The ramp is integrally formed at a portion of the bore 310B with the ramp angling up when looking into the input connection port 236, output connection ports OCPx or pass-through connection port. The ramp allows the housing 20 of fiber optic connector 100 to push and translate the securing member 310M downward against the securing feature resilient member 310RM as the housing 20 is inserted in the input connection port 236. Ramp may have any suitable geometry. Once the locking feature 310L of the securing member 310M is aligned with the cooperating geometry of the locking feature 20L of fiber optic connector 100, then the securing member 310M translates upward so that the locking feature 310L engages the locking feature 20L of the fiber optic connector.

Locking feature 310L comprises a retention surface 310RS. In this embodiment, the back-side of the ramp of locking feature 310L forms a ledge that cooperates with complimentary geometry on the housing 20 (or external connector). However, retention surface 310RS may have different surfaces or edges that cooperate for securing connector for creating the desired mechanical retention. For instance, the retention surface 310RS may be canted or have a vertical wall. However, other geometries are possible for the retention surface 310RS.

Connection ports of terminal 200 each comprises a respective optical connector opening 238 extending from an outer surface 234 of the terminal 200 into a cavity 216 of the terminal 200 and defining a portion of a connection port passageway 233 for receiving fiber optic connector 100. By way of explanation, the connection ports may be is molded as a portion of shell 210, but other constructions are possible such as sleeving the ports. At least one securing feature 310 is associated with the connection port passageway 233 for cooperating with the external fiber optic connector 100.

Returning to FIG. 6, terminal 200 depicts a portion of an assembly having an explanatory terminal 200 comprising a shell 210 comprising at least one input connection port 236, a plurality of output connection ports OCPx and a modular adapter sub-assembly 310SA associated with the input connection port 236 and each of the plurality of output connection ports OCPx as discussed in further detail herein.

As depicted in FIG. 6, terminals 200 disclosed may use one or more modular adapter sub-assemblies 310SA (FIGS. 7 and 8) disposed within the shell 210 when assembled for a scalable form-factor for manufacturing similar devices with different connector port counts. However, the concepts may be employed without the use of the modular adapter sub-assemblies by having the adapters mounted on a common part, but then the adapters for the individual connection ports would not "float" independently. The shell 210 comprises at least one input connection port 236 and one or more output connection ports OCPx respectively associated with one or more respective securing features 310 cooperating with the connection ports for providing quick and easy optical connectivity with external connectors for providing a robust and reliable assembly design that is intuitive to use. Likewise, terminals 200 may use ports for the pass-through ports as desired.

The securing feature 310 advantageously allows the user to make a quick and easy optical connection at the connector port(s) of terminal 200. The securing feature 310 may also operate for providing a connector release feature by moving the actuator 310A such as a button to translate the securing member 310M to an open position (e.g., downward) for releasing the external fiber optic connector 100. As used herein, the "securing member" associated with the terminal and excludes threads and features that cooperate with bayonets. However, other terminals may use any suitable construction for attaching an external connector to the connection port.

External connectors terminated to respective optical links 10x may be retained within the respective ports of the terminal 200 by pushing and fully-seating the connector within the output connection ports OCPx if the securing member 310M is allowed to translate to an open position when inserting the external fiber optic connector. To release the connector from the respective port, the actuator 310A is actuated by moving the actuator 310A (e.g., pressing the button downward) and translating the securing member 310M so that the locking feature disengages from the external connector and allowing the connector to be removed from the port. Stated another way, the at least one securing feature 310 is capable of releasing the connector when a portion of the securing feature 310 (i.e., the securing member 310M) translates within a portion of a securing feature passageway 245 of the shell 210. The full insertion and automatic retention of the connector may advantageously allow one-handed installation of the connector by merely pushing the external connector into the respective port. The devices disclosed may accomplish this connector retention feature upon full-insertion by biasing the securing member 310M of the modular adapter sub-assemblies 310SA to the retain position. However, other modes of operation for retaining and releasing the connector are possible according to the concepts disclosed. As discussed, the securing feature may be designed to require actuation by translating the actuator 310A for inserting the connector; however, this may require a two-handed operation.

Shell 210 may be formed by a first portion 210A and a second portion 210B, but other constructions are possible for shell 210 using the concept disclosed. Terminal 200 may comprise mounting features 210MF that are integrally formed in the shell 210 as shown in FIGS. 4-6. Additionally, the mounting features may be separate components attached to shell 210 for mounting the device as depicted in FIG. 6. By way of example, terminals 200 show the shells 210 having mounting features 210MF disposed near the sides of shell 210. Thus, the user may simply use a fastener such as a zip-tie threaded thru these lateral passageways for mounting the terminal 200 to a wall or pole as desired. In FIG. 6 another mounting feature 210MF is disposed adjacent the first end 212 of terminal 200 and includes a mounting tab 298 attached to shell 210, and the mounting feature 210MF adjacent the second end 214 is a through hole with a support 210S. However, mounting features 210MF may be disposed at any suitable location on the shell 210 or connection port insert 230. Shell 210 may also include one or more notches on the bottom side for aiding in securing the device to a round pole or the like.

Securing member 310M may be biased by a resilient member 230RM to the retain position RP (e.g., upward). Furthermore, the securing features 310 or portions of securing features 310 may be constructed as a portion of a modular adapter sub-assemblies 310SA such as shown in FIGS. 7 and 8 for easy assembly of the terminal 200.

Moreover, the modular sub-assemblies 230SA advantageously allow the mating components for each connection port 236 to move or "float" independently of other mating components relative to the shell 210 for the other connection ports for preserving optical performance. "Float" means that the adapter 230A can have slight movement in the X-Y plane for alignment, and may be inhibited from over-traveling in the Z-direction along the axis of connector insertion so that suitable alignment may be made between mating connectors, which may include a biasing spring for allowing some displacement of the adapter 230A with a suitable restoring force provided by the spring.

As best depicted in FIG. 6, a portion of actuator 310A is disposed within a portion of the securing feature passageway 245 when assembled and cooperates or engages with securing member 310M to provide linear downward translation of the respective securing member 310M. When assembled, the translating of the actuator 310A causes the securing member to translate from a retain position RP to an open position OP and vice versa. Consequently, a portion of securing feature 310 (i.e., the securing member 310M) is capable of translating within a portion of the securing feature passageway 245 transverse to the longitudinal axis of the connection port passageway when translating the actuator 310A relative to the securing feature passageway 245 or shell. If a push and click port is desired when the securing feature 310 is in the retain position, then the actuator 310A would only influence the position of the securing member 310M in one direction (and a securing feature resilient member 310RM would be used) so that the external connector may be still be inserted when the actuator 310A is placed in the retain position by allowing the translation of the securing member 310M downward upon insertion. Actuator 310A may also include a sealing feature (not numbered) for providing a seal between a portion of the securing feature 310 and the securing feature passageway 245 to inhibit dirt, dust and debris from entering the device. As shown, the sealing feature is disposed on an outer portion of the actuator 310A.

The securing member 310M comprises a bore 310B that is aligned with the connector port passageway 233 when assembled. Bore 310B is sized for receiving a suitable external connector therethrough for securing the same for optical connectivity. Bores or openings through the securing member 310M may have any suitable shape or geometry for cooperating with its respective external connector (or housing 20). As used herein, the bore may have any suitable shape desired including features on the surface of the bore for engaging with the desired connector. Bore 310B is disposed on the securing member 310M may also comprise any suitable locking feature disposed within the bore 310B as desired. For instance, the locking feature 310L disposed within the bore 310B may be a pin, pin with a ramp, or other suitable structure for engaging with the external connector.

In some embodiments, a portion of the securing member 310M is capable of moving to an open position when inserting a suitable external connector 10 into the connection port passageway 233. When the connector 10 is fully-inserted into the connector port passageway 233, the securing member 310M is capable of moving to the retain position automatically. Consequently, the external connector is secured within the respective port by the securing feature 310 without turning a coupling nut or a bayonet on the external connector like the prior art terminals. Stated another way, the securing member 310M translates from the retain position to an open position as the external fiber optic connector 100 is inserted into the respective port. The securing feature passageway 245 is arranged transversely to a longitudinal axis LA of the terminal 200, but other arrangements are possible. Other securing features may operate in a similar manner, and use an opening instead of a bore that receives the connector therethrough.

Generally speaking, the connection port passageways may be configured for the specific connector intended to be received in the port. Likewise, the connection port passageways should be configured for receiving the specific internal connector 252 for mating and making an optical connection with the external fiber optic connector 100.

The terminal 200 may also comprise at least one adapter 230A aligned with the respective output connection ports OCPx. Adapter 230A and other components are a portion of the modular sub-assembly 310SA as depicted in FIGS. 7 and 8. Adapter 230A is suitable for securing a internal fiber optic connector 252 thereto for aligning the internal connector 252 with the respective port. One or more optical fibers may be routed from the second coupler (C2) to the respective output connection ports OCPx of the terminal 200. For instance, the internal fiber optic connectors 252 may terminate the optical fibers 92' that are in optical communication with the second coupler (C2) for optical connection at output connection ports OCPx.

A plurality of internal fiber optic connectors 252 are aligned with the respective connector port passageways within the cavity 216 of the terminal 200. The internal fiber optic connectors 252 are associated with one or more of the plurality of optical fibers 92'. Each of the respective internal fiber optic connectors 252 aligns and attaches to a structure such as the adapter 230A or other structure related to the connection port passageway in a suitable matter. The plurality of internal fiber optic connectors 252 may comprise a suitable connector ferrule 252F as desired and internal fiber optic connectors 252 may take any suitable form from a simple ferrule that attaches to a standard connector type inserted into an adapter. By way of example, internal fiber optic connectors 252 may comprise a resilient member for biasing the connector ferrule 252F or not. Additionally, internal fiber optic connectors 252 may further comprise a keying feature.

The internal fiber optic connectors 252 shown in FIGS. 7 and 8 have a SC footprint, but other connectors are possible with or without the use of an adapter. As known, the SC footprint may be defined according to IEC 61754:2013. If SC connectors are used as the internal fiber optic connector 252 they have a keying feature that cooperates with the keying feature of adapter 230A. Additionally, adapters 230A comprise a retention feature (not visible) for seating the adapters 230A in the device adjacent to the connection port passageway. Further, adapters 230A may comprise latch arms for securing respective internal fiber optic connectors therein.

The port passageways 233 may comprise a keying portion disposed forward of the securing feature 310 in connection port passageway. The keying portion may be an additive keying portion to the primitive geometric round shape of the input connection port passageway 233 such as a male key that is disposed forward of the securing feature in the port passageway. However, the concepts for the input connection port 236 (or connector port) of terminals may be modified for different housing or connector designs or not use a keying portion at all.

In this embodiment, the internal fiber optic connectors 252 are attached to optical fibers 92' that are in communication with the input optical fibers. When assembled, the modular adapter sub-assembly 310SA for the output connection ports OCPx are disposed in second portion 210B of shell 210.

Consequently, the coupler receives the optical signal as desired for splitting into multiple signals such as 1×N split for distribution of optical signals in the fiber optic network. For instance, the coupler may have a 1×8 split within the terminal 200 for providing eight second coupler outputs optical fibers to optically communicate with eight output connection ports OCPx on the terminal 200, but any suitable number of second coupler outputs are possible. Likewise, the output connection ports OCPx may be configured as a single-fiber port or multi-fiber port if desired with suitable fiber optic connectors. For the sake of simplicity and clarity in the drawings, all of the optical fiber pathways may not be illustrated or portions of the optical fiber pathways may be removed in places so that other details of the design are visible.

Additionally, the terminals or shells 210 may comprise at least one support 210S or fiber guide for providing crush support for the terminal and resulting in a robust structure. As depicted in FIG. 6, terminal 200 may comprise a support 210S configured as a support insert that fits into shell 210. Support 210S has a bore therethrough and may act as a mounting feature for the use to a fastener to mount the terminal 200. Consequently, the support 210S carries the majority of any crushing forces that may be applied by the fastener and inhibits damage to the shell 210. Support 210S may also be located and attached to the shell at a location outside of the sealing interface between the first portion 210A and the second portion 210B of shell 210. Further, the components of the shell 210 may have interlocking features between the first portion 210A and the second portion 210B of the shell 210. Specifically, portions of the terminal may have a tongue 210T and groove 210G construction for alignment or sealing of the device. As depicted, support 210S is located outside of the sealing interface of the second portion 210B of shell 210.

Terminals 200 disclosed herein may optionally be weatherproof by appropriately sealing seams of the shell 210 using any suitable means such as gaskets, O-rings, adhesive, sealant, welding, overmolding or the like. To this end, terminal 200 or devices may also comprise a sealing element 290 disposed between the first portion 210A and the second portion 210B of the shell 210. The sealing element 290 may cooperate with shell 210 geometry such as respective grooves 210G or tongues 210T in the shell 210. Grooves or tongue may extend about the perimeter of the shell 210. By way of explanation, grooves 210G may receive one or more appropriately sized O-rings or gaskets 290A for weatherproofing terminal 200, but an adhesive or other material may be used in the groove 210G. By way of example, the O-rings are suitably sized for creating a seal between the portions of the shell 210. By way of example, suitable O-rings may be a compression O-ring for maintaining a weatherproof seal. Other embodiments may use an adhesive or suitable welding of the materials for sealing the device. If welding such as ultra-sonic or induction welding of the shell is used a special sealing element 290 may be used as known in the art. If the terminal 200 is intended for indoor applications, then the weatherproofing may not be required.

To make identification of the port(s) easier for the user, a marking indicia may be used such as text or color-coding of the terminal, color codes on the actuator 310A, or marking a cable tether of an optical link (e.g. an orange or green polymer) or the like. Further, terminals may have the ports disposed in any suitable location.

FIG. 6 depicts a view of the second portion 210B of shell 210 defining a portion of cavity 216. Shell 210 may have any suitable shape, design or configuration as desired. Second portion 210B cooperates with first portion 210A (i.e., a cover) to form shell 210. Second portion 210B may comprises the input connection port 236, the output connection ports OCPx, or pass-through connection ports as desired. Second portion 210B provides a portion of cavity 216 of terminal 200, and the internal bottom surface of second portion 210B may comprises a plurality of alignment features 210AF for aligning one or more the modular adapter sub-assembly 310SA (FIG. 6) with the respective output connection ports OCPx. Alignment features 210AF may have a U-shape and cooperate with the alignment features 255AF on the bottom of adapter body 255. Second portion 210B also includes a plurality of studs 210D on top of the respective connection ports 236 within cavity 216 for seating the hoop 255H of the adapter body 255 for assembly. Second portion 210B may also include a plurality of guide features 210SF for aligning the first portion 210A with the second portion 210B of the shell 210.

The second portion 210B of shell 210 may include other features. The shell 210 may comprise a keying portion (not visible) in the input connection port 236 and/or in the output connector ports OCPx. For instance, keying portion may be an additive keying portion to the primitive geometric round shape of the connection port passageway 233 such as a male key that is disposed forward of the securing feature in the connection port passageway 233. However, the concepts for the ports may be modified for different housings 20 of the fiber optic connector 100 and/or the connector designs. For instance, the keying portion may be defined as a walled-portion across part of the connection port passageway so that the input connection port 236 or output connection ports OCPx with the keying portion would be able to properly receive a housing 20 of an external fiber optic connector having a portion with a proper D-shape.

As shown in FIG. 6 the second portion 210B of shell 210 may comprise structure on the front end 212 that cooperates with mounting tab 298 for aligning and attaching the same to the shell 210 of the terminal 200. In other embodiments, the mounting tab could be integrally formed with the shell 210, but that requires a more complex molding process.

As shown, the connector ports of the terminal 200 may comprise a marking indicia such as an embossed number or text, but other marking indicia are also possible. For instance, the marking indicia may be on the securing feature 310 such as text on the sliding actuator or the sliding actuator(s) may be color-coded to indicate fiber count, input or output for the associated connection port or input port.

FIG. 7 shows an assembled view of the modular adapter sub-assembly 310SA for the output connection ports OCPx depicted in FIG. 6. Modular adapter sub-assemblies 310SA enable quick and easy assembly of terminals 200 in a scalable manner. Moreover, the modular sub-assemblies 230SA advantageously allow the mating components (i.e., the adapters 230A) corresponding to each connection port 236 to move or "float" independently of other the other modular adapter sub-assemblies 310SA relative to the shell 210 for preserving optical performance.

FIG. 7 also depicts the internal fiber optic connector 252 (internal connector of the terminal 200) attached to adapter 230A in addition to modular adapter sub-assembly 310SA with an internal fiber optic connector 252. FIG. 8 depicts an exploded view of the modular adapter sub-assembly 310SA and shows that the internal fiber optic connector 252 is not a portion of modular adapter sub-assembly 310SA. Modular adapter sub-assemblies 310SA comprises an adapter 230A aligned with the at least one output connection port OCP when assembled. Adapter 230 may be biased by a resilient member 230RM.

As best shown in FIG. 8, modular adapter sub-assembly 310SA comprises a portion of securing feature 310 and a securing feature resilient member 310RM. Specifically, modular adapter sub-assembly 310SA comprises securing member 310M. However, other embodiments could also comprise an actuator 310A as part of the assembly. Securing member 310M is inserted into a front end of an adapter body 255 along with securing feature resilient member 310RM. Specifically, the rim or upper portion of securing member 310M is inserted into a hoop 255H of adapter body 255 and standoffs 310SO are disposed in a portion of the resilient member pocket 255SP at the bottom of the adapter body 255. Securing feature resilient member 310RM is disposed in the resilient member pocket 255SP for biasing the securing member 310M to a retain position (i.e., upward) as shown in FIG. 7. This construction advantageously keeps the assembly intact using the securing feature resilient member 310RM. Standoffs 310SO of adapter body 255 may also act as stops to limit the translation of the securing member 310.

In this embodiment, modular adapter sub-assembly 310SA may comprises an adapter body 255, securing member 310M, securing feature resilient member 310RM, a ferrule sleeve 230FS, a ferrule sleeve retainer 230R, resilient member 230RM, a retainer along with the adapter 230A. Adapter body 255 has a portion of the connection port passageway 233 disposed therein.

As best depicted in FIG. 8, the is resilient member 230RM is assembled so that is disposed over a barrel of adapter 230A and seated on the flange of adapter 230A, then retainer 240 can be attached to adapter body 255 using latch arms 240LA to secure the same. Ferrule sleeve retainer 230R and ferrule sleeve 230FS are aligned for assembly into the adapter 230A for assembly as shown and seated using the ferrule sleeve retainer 230R. Of course, other variations of the modular adapter sub-assembly 310SA are possible.

The modular sub-assemblies 310SA for the output connection ports OCPx may be assembled into the second portion 210B of shell 200 as depicted by FIG. 6. As shown, modular adapter sub-assemblies 310AS are aligned and installed onto the U-shaped alignment features 210AF of the second portion 210B of shell 210. Specifically, the alignment features 210AF of the second portion 210B of shell 210 cooperating with the alignment features 255AF on the bottom of adapter body 255 (FIG. 8) to align the same with the output connection ports OCPx. Further, the hoops 255H of the adapter bodies 255 disposed about the plurality of studs 210D on top of the respective output connection ports OCPx within cavity 216 for aligning the modular adapter sub-assembly 310SA within the second portion 210B of shell 210 for aligning the connection port passageway 233 of the adapter body 255 with the connection port passageway 233 of the shell 210.

First portion 210A of shell 210 may also comprises alignment features sized and shaped for cooperating with the alignment features on the top of adapter body 255 for securing the same when the terminal is assembled. The respective alignment features only allow assembly of the modular adapter sub-assemblies 310SA into the shell 210 in one orientation for the correct orientation of the locking feature 310L with respect to the connection port 236.

The sealing member is sized for the perimeter of the actuator for sealing the securing feature passageway 245.

Actuator 310A may also include a stop surface that is larger than the opening in the shell 210 and retains the actuator 310A within the securing feature passageway 245 when assembled and inhibits the actuator from being removed from the terminal 200 when assembled.

Actuator 310A may also be a different color or have a marking indicia for identifying the port type. For instance, the actuator 310A may have a first color for output connection ports OCPx and a second color for pass-through ports, multi-fiber ports or ports for split signals. Other marking indicia schemes may be used as desired.

When an external fiber optic connector is inserted into the respective port, locking feature of the external connectors are disposed within bore 310B of securing member 310M. As shown in FIGS. 9-11, locking feature 310L is configured as ramp 310RP that runs to a short flat portion, then to a ledge for creating the retention surface 310RS for engaging and retaining the external connector (or housing 20) once it is fully-inserted into the connector port passageway of the output connection port OCP. Consequently, the securing feature 310 is capable of moving to an open position (OP) when inserting a suitable fiber optic connector 100 into the connector port passageway 233 since the connector housing 20 engages the ramp 310RP pushing the securing feature downward during insertion. However, other locking features may be used with the concepts disclosed herein.

Securing member 310M may also comprises standoffs 310 as best shown in FIG. 11. Standoffs 310 SO cooperate with the resilient member pocket 255SP of the adapter body 255 for keeping the bore 310B in the proper rotational orientation within the respective to the adapter body 255. Specifically, standoffs 310 have curved shapes that only allow the securing member 310M to fully-seat into the adapter body 255 when oriented in the proper orientation.

As best shown in FIG. 8, adapter body 255 comprises an adapter body bore 255B that comprises a portion of the connection port passageway 233 when assembled. As discussed, adapter body 255 comprises alignment features 255AF on the bottom of adapter body 255 that cooperate with the shell 210 to align and seat the same in the shell 210. Adapter body 255 also comprises hoop 255H. Hoop 255H captures a portion of the securing member 310M when assembled, and also seats the adapter body 255 in the second portion 210B of shell 210 during assembly. Adapter body 255 also comprises alignment features 255AFT on the top of adapter body 255 for securing the same in the first portion 210A of the shell 210 when the terminal 200 is assembled. Adapter body 255 also comprise resilient member pocket 255SP at the bottom of the adapter body 255 for capturing the securing feature resilient member 310RM as depicted in FIG. 7.

Adapter 230A comprises a plurality of resilient arms 230RA comprising securing features (not numbered). Adapter 230A also comprises an adapter key 230K for orientating the adapter 230A with the adapter body 255. Securing features 230SF cooperate with protrusions on the housing of internal fiber optic connector 252 for retaining the internal fiber optic connector 252 to the adapter 230A. The ferrule 252F is disposed within the ferrule sleeve 230FS when assembled. Ferrule sleeves 230FS are used for precision alignment of mating ferrules between internal connectors 252 and the external connectors. Adapters 230A are secured to an adapter body 255 using retainer 240. Adapters 230A may be biased using a resilient member 230RM as shown. Internal fiber optic connectors 252 may take any suitable form and be aligned for mating with the connector secured with the connection ports 236 in any suitable manner. Devices may use alternative internal connectors if desired and can have different structures for supporting different internal connectors.

As depicted in FIGS. 12-15, housing 20 of fiber optic connector 100 comprises an outer surface OS having a locking feature 20L integrally formed in the outer surface OS. Locking feature 20L is used for holding the connector 100 in the port of the terminal 200. The housing 20 may also include a keying portion 20KP for orientating the rotational position upon insertion into the input connection port of the terminal. For instance, the keying portion 20KP may comprise a female key, but other keys may be used. The female key would cooperate with protrusion or male key disposed on the passageway of the input connection port of the terminal. Additionally, the locking feature 20L may be orientated relative to the keying portion 20L in any suitable fashion. By way of explanation, the locking feature 20L may be disposed about 180 degrees from the keying portion 20KP or the female key. Of course, other rotational orientations may be possible with the concepts disclosed. An O-ring 65 may be disposed on housing 20. The O-ring may be disposed rearward of the locking feature 20L for sealing the housing 20 to the input connection port 236.

Locking feature 20L of housing 20 may have any suitable geometry desired. For instance, the locking feature 20L may comprise a notch, a groove, a shoulder or a scallop as desired. As depicted, locking feature 20L comprises a notch integrally formed in the outer surface OS of housing 20, but other structures are possible. In this instance, the notch comprises a ramp with a ledge. The ledge is formed at the forward end of the notch to form a retention force for holding the housing. However, retention surface 310RS may have different surfaces or edges that cooperate for securing the cable input device and creating the desired mechanical retention. For instance, the ledge may be canted or have a vertical wall. However, other geometries are possible such as a hole for receiving a pin on the securing feature of the terminal.

The concepts disclosed allow relatively small terminals 200 having a relatively high-density of connections along with an organized arrangement for connectors 10 attached to the terminals 200. Shells have a given height H, width W and length L that define a volume for the terminal as depicted in FIG. 4. By way of example, shells 210 of terminal 200 may define a volume of 800 cubic centimeters or less, other embodiments of shells 210 may define the volume of 400 cubic centimeters or less, other embodiments of shells 210 may define the volume of 100 cubic centimeters or less as desired. Some embodiments of terminals 200 comprise a connection port insert 230 having a port width density of at least one connection port 236 per 20 millimeters of width W of the terminal 200. Other port width densities are possible such as 15 millimeters of width W of the terminal. Likewise, embodiments of terminals 200 may comprise a given density per volume of the shell 210 as desired.

The concepts disclosed allow relatively small form-factors for terminals as shown in Table 1. Table 1 below compares representative dimensions, volumes, and normalized volume ratios with respect to the prior art of the shells (i.e., the housings) for multiports having 4, 8 and 12 ports as examples of how compact the terminal of the present application may be with respect to conventional prior art multiports. Specifically, Table 1 compares examples of the conventional prior art multiports such as depicted in FIG. 1 with terminals having a linear array of ports. As depicted, the respective volumes of the conventional prior art multiports of FIG. 1 with the same port count are on the order of ten times larger than terminals or multiports with the same port count as disclosed herein. By way of example and not limitation, the terminals may define a volume of 400 cubic centimeters or less for 12-ports, or even if double the size could define a volume of 800 cubic centimeters or less for 12-ports. Terminals with smaller port counts such as 4-ports could be even smaller such as the shell or terminal defining a volume of 200 cubic centimeters or less for 4-ports, or even if double the size could define a volume of 200 cubic centimeters or less for 4-ports. Devices with sizes that are different will have different volumes form the explanatory examples in Table 1 and these other variations are within the scope of the disclosure. Consequently, it is apparent the size (e.g., volume) of terminals of the present application may be much smaller than the conventional prior art multiports of FIG. 1. Of course, the examples of Table 1 are for comparison purposes and other sizes and variations of multiports may use the concepts disclosed herein as desired.

One of the reasons that the size of the terminals may be reduced in size with the concepts disclosed herein is that the cable input device and/or external connectors that cooperate with the terminals have locking features that are integrated into the housing 20 of the fiber optic connector 100. In other words, the locking features for holding the fiber optic connector in the respective port of the terminal are integrally formed in the housing of the connector, instead of being a distinct and separate component.

In other words, fiber optic connectors 100 avoid bulky structures such as a coupling nut or bayonet used with conventional hardened external connectors and multiports. In other words, conventional external connectors for multiports have threaded connections or bayonets that require finger access for connection and disconnecting. By eliminating the threaded coupling nut or bayonets (which is a separate component that must rotate about the connector) the spacing between conventional connectors may be greatly reduced. Also eliminating the dedicated coupling nut from the conventional connectors also allows the footprint of the connectors to be smaller, which may also aid in reducing the size of the terminals disclosed herein.

TABLE 1

Comparison of Conventional Multiport of FIG. 1 with Terminals of Present Application

| Multiport Type | Port Count | Dimension L × W × H (mm) | Volume (cm³) | Normalized Volume Ratio |
|---|---|---|---|---|
| Prior Art FIG. 1 | 4 | 274 × 66 × 73 | 1320 | 1.0 |
|  | 8 | 312 × 76 × 86 | 2039 | 1.0 |
|  | 12 | 381 × 101 × 147 | 5657 | 1.0 |
| Linear | 4 | 76 × 59 × 30 | 134 | 0.10 |
|  | 8 | 123 × 109 × 30 | 402 | 0.20 |
|  | 12 | 159 × 159 × 30 | 758 | 0.14 |

Although the disclosure has been illustrated and described herein with reference to explanatory embodiments and specific examples thereof, it will be readily apparent to those of ordinary skill in the art that other embodiments and examples can perform similar functions and/or achieve like results. For instance, the connection port insert may be configured as individual sleeves that are inserted into a passageway of a device, thereby allowing the selection of different configurations of connector ports for a device to tailor the device to the desired external connector. All such equivalent embodiments and examples are within the spirit and scope of the disclosure and are intended to be covered by the appended claims. It will also be apparent to those skilled in the art that various modifications and variations can be made to the concepts disclosed without departing from the spirit and scope of the same. Thus, it is intended that the present application cover the modifications and variations provided they come within the scope of the appended claims and their equivalents.

I claim:

1. A fiber optic terminal comprising:
   a shell comprising a cavity;
   one or more input optical fibers disposed within the cavity (216) of the shell;
   a first output connection port of the fiber optic terminal, wherein the first output connection port is in optical communication with one or more of the input optical fibers;
   a second output connection port of the fiber optic terminal, wherein the second output connection port is in optical communication with one or more of the input optical fibers; and
   at least one loopback assembly comprising a loopback optical fiber comprising a Bragg grating, a first fiber optic connector terminated on a first end of the loopback optical fiber, and a second fiber optic connector terminated on a second end of the loopback optical fiber, wherein the first fiber optic connector is attached to the first output connection port and the second fiber optic connector is attached to the second output connection port so that the first output connection port is in optical communication with the second output connection port by way of the loopback optical fiber.

2. The fiber optic terminal of claim 1, wherein the first output connection port further comprises a securing feature biased to a retain position by a resilient member.

3. The fiber optic terminal of claim 2, wherein the securing feature comprises a bore comprising a locking feature for attaching the first fiber optic connector.

4. The fiber optic terminal of claim 3, wherein the locking feature comprises a ramp with a ledge.

5. The fiber optic terminal of claim 3, wherein the locking feature comprises a retention surface.

6. The fiber optic terminal of claim 1, wherein the terminal is weatherproof.

7. The fiber optic terminal of claim 1, wherein the first output connection port comprises a first internal fiber optic connector disposed within the cavity of the terminal;
   the second output connection port comprises a second internal fiber optic connector disposed within the cavity of the terminal; and
   the first internal fiber optic connector is in optical communication with the first fiber optic connector terminated on the first end of the loopback optical fiber, and the second internal fiber optic connector is in optical communication with the second fiber optic connector terminated on the second end of the loopback optical fiber.

8. The fiber optic terminal of claim 1, wherein the shell defines a volume of 800 cubic centimeters or less.

9. The fiber optic terminal of claim 1, wherein the fiber optic terminal has a port width density of at least one connection port per 20 millimeters of width of terminal.

10. The fiber optic terminal of claim 1, wherein the loopback optical fiber has a length of 10 centimeters or less.

11. The fiber optic terminal of claim 1, wherein the first fiber optic connector is attached to the first output connection port using a threaded fastener and the second fiber optic connector is attached to the second output connection port using a threaded fastener.

12. The fiber optic terminal of claim 1, further comprising a second loopback assembly comprising a second loopback optical fiber, wherein a third fiber optic connector is terminated on a first end of the second loopback optical fiber, and a fourth fiber optic connector terminated on a second end of the second loopback optical fiber, wherein the third fiber optic connector is attached to a third output connection port and the fourth fiber optic connector is attached to a fourth output connection port so that the third output connection port is in optical communication with the fourth output connection port by way of the second loopback optical fiber.

13. The fiber optic terminal of claim 12, wherein the second loopback optical fiber comprises a length that is 50 centimeters or longer than the loopback optical fiber.

14. The fiber optic terminal of claim 12, wherein the second loopback optical fiber comprises a Bragg grating.

15. The fiber optic terminal of claim 14, wherein the Bragg grating of the second loopback optical fiber is disposed at a distance of 50 centimeters or greater from the first end of the second loopback optical fiber.

16. A fiber optic terminal comprising:
a shell comprising a cavity;
one or more input optical fibers disposed within the cavity of the shell;
a first output connection port of the fiber optic terminal, wherein the first output connection port is in optical communication with one or more of the input optical fibers, and the first output connection port further comprises a securing feature biased to a retain position by a resilient member;
a second output connection port of the fiber optic terminal, wherein the second output connection port is in optical communication with one or more of the input optical fibers, and the second output connection port further comprises a securing feature biased to a retain position by a resilient member; and
at least one loopback assembly comprising a loopback optical fiber comprising a Bragg grating, a first fiber optic connector terminated on a first end of the loopback optical fiber, and a second fiber optic connector terminated on a second end of the loopback optical fiber, wherein the first fiber optic connector is attached to the first output connection port and the second fiber optic connector is attached to the second output connection port so that the first output connection port is in optical communication with the second output connection port by way of the loopback optical fiber.

17. The fiber optic terminal of claim 16, wherein the securing feature of the first output connection port comprises a bore having a locking feature for attaching the first fiber optic connector.

18. The fiber optic terminal of claim 17, wherein the locking feature comprises a ramp with a ledge.

19. The fiber optic terminal of claim 17, wherein the locking feature comprises a retention surface.

20. The fiber optic terminal of claim 16, wherein the terminal is weatherproof.

21. The fiber optic terminal of claim 16, wherein the first output connection port comprises a first internal fiber optic connector disposed within the cavity of the terminal;
the second output connection port comprises a second internal fiber optic connector disposed within the cavity of the terminal; and
the first internal fiber optic connector is in optical communication with the first fiber optic connector terminated on the first end of the loopback optical fiber), and the second internal fiber optic connector is in optical communication with the second fiber optic connector terminated on the second end of the loopback optical fiber.

22. The fiber optic terminal of claim 16, wherein the shell defines a volume of 800 cubic centimeters or less.

23. The fiber optic terminal of claim 16, wherein the fiber optic terminal has a port width density of at least one connection port per 20 millimeters of width of terminal.

24. The fiber optic terminal of claim 16, further comprising a second loopback assembly comprising a second loopback optical fiber, wherein a third fiber optic connector is terminated on a first end of the second loopback optical fiber, and a fourth fiber optic connector terminated on a second end of the second loopback optical fiber, wherein the third fiber optic connector is attached to a third output connection port and the fourth fiber optic connector is attached to a fourth output connection port so that the third output connection port is in optical communication with the fourth output connection port by way of the second loopback optical fiber.

25. The fiber optic terminal of claim 24, wherein the second loopback optical fiber comprises a length that is 50 centimeters or longer than the loopback optical fiber.

26. The fiber optic terminal of claim 24, wherein the second loopback optical fiber comprises a Bragg grating.

27. The fiber optic terminal of claim 26, wherein the Bragg grating of the second loopback optical fiber is disposed at a distance of 50 centimeters or greater from the first end of the second loopback optical fiber.

28. A fiber optic network comprising:
a terminal comprising:
a shell comprising a cavity;
one or more input optical fibers disposed within the cavity of the shell;
a first output connection port of the fiber optic terminal, wherein the first output connection port is in optical communication with one or more of the input optical fibers;
a second output connection port of the fiber optic terminal, wherein the second output connection port is in optical communication with one or more of the input optical fibers; and
at least one loopback assembly comprising a loopback optical fiber comprising a Bragg grating, a first fiber optic connector terminated on a first end of the loopback optical fiber, and a second fiber optic connector terminated on a second end of the loopback optical fiber, wherein the first fiber optic connector is attached to the first output connection port and the second fiber optic connector is attached to the second output connection port so that the first output connection port is in optical communication with the second output connection port by way of the loopback optical fiber;
a first optical link in optical communication with the one or more input optical fibers of the terminal.

29. The fiber optic network of claim 28, wherein the first output connection port further comprises a securing feature biased to a retain position by a resilient member.

30. The fiber optic network of claim 29, wherein the securing feature comprises a bore comprising a locking feature for attaching the first fiber optic connector.

31. The fiber optic network of claim 30, wherein the locking feature comprises a ramp with a ledge.

32. The fiber optic network of claim 30, wherein the locking feature comprises a retention surface.

33. The fiber optic network of claim 28, wherein the terminal is weatherproof.

34. The fiber optic network of claim 28, wherein the first output connection port comprises a first internal fiber optic connector disposed within the cavity of the terminal;

the second output connection port comprises a second internal fiber optic connector disposed within the cavity of the terminal; and the first internal fiber optic connector is in optical communication with the first fiber optic connector terminated on the first end of the loopback optical fiber, and the second internal fiber optic connector is in optical communication with the second fiber optic connector terminated on the second end of the loopback optical fiber.

35. The fiber optic network of claim 28, wherein the shell defines a volume of 800 cubic centimeters or less.

36. The fiber optic network of claim 28, wherein the fiber optic terminal has a port width density of at least one connection port per 20 millimeters of width of terminal.

37. The fiber optic network of claim 28, wherein the loopback optical fiber has a length of 10 centimeters or less.

38. The fiber optic network of claim 37, wherein the first fiber optic connector is attached to the first output connection port using a threaded fastener and the second fiber optic connector is attached to the second output connection port using a threaded fastener.

39. The fiber optic network of claim 28, further comprising a second loopback assembly comprising a second loopback optical fiber, wherein a third fiber optic connector is terminated on a first end of the second loopback optical fiber, and a fourth fiber optic connector terminated on a second end of the second loopback optical fiber, wherein the third fiber optic connector is attached to a third output connection port and the fourth fiber optic connector is attached to a fourth output connection port so that the third output connection port is in optical communication with the fourth output connection port by way of the second loopback optical fiber (219).

40. The fiber optic network of claim 39, wherein the second loopback optical fiber comprises a length that is 50 centimeters or longer than the loopback optical fiber.

41. The fiber optic network of claim 39, wherein the second loopback optical fiber comprises a Bragg grating.

42. The fiber optic network of claim 41, wherein the Bragg grating of the second loopback optical fiber is disposed at a distance of 50 centimeters or greater from the first end of the second loopback optical fiber.

* * * * *

UNITED STATES PATENT AND TRADEMARK OFFICE
CERTIFICATE OF CORRECTION

PATENT NO. : 11,536,921 B2
APPLICATION NO. : 17/171275
DATED : December 27, 2022
INVENTOR(S) : Robert Bruce Elkins, II Page 1 of 1

It is certified that error appears in the above-identified patent and that said Letters Patent is hereby corrected as shown below:

On the Title Page

In item (56), in Column 2, under "Other Publications", Line 1, delete "Plasti" and insert -- Plastic --.

In item (56), in Column 2, under "Other Publications", Line 2, delete "from" and insert -- from: --.

On the Page 2, in Column 2, under "U.S. Patent Documents", Line 48, delete "Bauer" and insert -- Fahmbauer --.

On the Page 7, in Column 1, under "Other Publications", Line 7, delete "L." and insert -- L., --.

On the Page 7, in Column 2, under "Other Publications", Line 1, delete "lopp" and insert -- loop --.

On the Page 7, in Column 2, under "Other Publications", Line 14, delete "Poeceedings" and insert -- Proceedings --.

In the Claims

Claim 21, Column 21, Line 67 delete "fiber)" and insert -- fiber --.

Signed and Sealed this
Seventeenth Day of December, 2024

Derrick Brent
*Acting Director of the United States Patent and Trademark Office*